US008776242B2

(12) United States Patent
McDougal

(10) Patent No.: US 8,776,242 B2
(45) **Date of Patent: *Jul. 8, 2014**

(54) PROVIDING A MALWARE ANALYSIS USING A SECURE MALWARE DETECTION PROCESS

(75) Inventor: Monty D. McDougal, St. Paul, TX (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/306,344

(22) Filed: Nov. 29, 2011

(65) Prior Publication Data

US 2013/0139260 A1 May 30, 2013

(51) Int. Cl.

*H04L 12/22* (2006.01)
*H04L 29/06* (2006.01)
*H04L 29/02* (2006.01)
*G06F 21/56* (2013.01)

(52) U.S. Cl.

CPC ............ *H04L 63/1433* (2013.01); *G06F 21/56* (2013.01); *H04L 63/145* (2013.01)
USPC .................................. 726/25; 726/22; 726/26

(58) Field of Classification Search

CPC combination set(s) only.
See application file for complete search history.

(56) References Cited

U.S. PATENT DOCUMENTS 7,543,055 B2 * 6/2009 Kohn ............................ 709/224
8,060,577 B1 * 11/2011 Conrad ......................... 709/216
8,201,244 B2 * 6/2012 Sun et al. ........................ 726/22
2005/0240991 A1 10/2005 Dombkowski et al.
2007/0226796 A1 9/2007 Gilbert et al. ................... 726/22
2008/0016339 A1 1/2008 Shukla .......................... 713/164
2009/0077664 A1 3/2009 Hsu et al. ........................ 726/24
2010/0071024 A1 3/2010 Eyada ............................... 726/1
2010/0100963 A1 4/2010 Mahaffey ........................ 726/25
2010/0132038 A1 5/2010 Zaitsev ........................... 726/22
2010/0180344 A1 7/2010 Malyshev et al. ............... 726/23
2010/0242082 A1 9/2010 Keene et al. ...................... 726/1
2010/0257592 A1 10/2010 Wang et al. ....................... 726/3
2011/0047597 A1 2/2011 Mahaffey et al. ................. 726/3
2011/0047620 A1 2/2011 Mahaffey et al. ............... 726/23
2011/0099203 A1 4/2011 Fastring ........................ 707/783
2011/0113491 A1 5/2011 Altshuler et al. ............... 726/24
2011/0138468 A1 6/2011 Chaudhry et al. .............. 726/24
2011/0197280 A1 8/2011 Young et al. .................... 726/24
2011/0238855 A1 9/2011 Korsunsky et al.

OTHER PUBLICATIONS

Enhancing Network Secruity by Preventing User-Initiate Malware Execution. Harrison, John V. Proceedings of the International Conference of Information Techonology: Coding and Computing. Mar. 2005.*
Raytheon High-Speed Guard. 2010.*
"International Application Serial No. PCT/US2012/067039, International Search Report mailed Feb. 5, 2013", 2 pgs.
"International Application Serial No. PCT/US2012/067039, Written Opinion mailed Feb. 5, 2013", 5 pgs.

* cited by examiner

*Primary Examiner* — Venkat Perungavoor
(74) *Attorney, Agent, or Firm* — Schwegman, Lundberg & Woessner, P.A.

(57) ABSTRACT

In certain embodiments, a computer-implemented system comprises a boundary controller and a first malware detection agent. The boundary controller is operable to implement a security boundary between a first computer network environment and a second computer network environment. The second computer network environment has a security classification level that is more restrictive than a security classification level of the first computer network environment. The boundary controller is operable to receive from the first computer network environment a file. The first malware detection agent is positioned in the second computer network environment and is operable to receive via the boundary controller the file and apply a first malware detection process on the file. The first malware detection process is subject to the security classification level of the second computer network environment.

27 Claims, 7 Drawing Sheets

600
140y
DETECTION AGENT
124
142y
BOUNDARY CONTROLLER
108
104
106
102
124
142y
110
112
116
144
MALWARE ANALYSIS SYSTEM
120 P
122 M
124
FILE
128 P
130 M
FILE MANAGEMENT
132
134 P
M 136
138 MALWARE DETECTION MODULE
142a 142b 142n
140a 140b 140n
124 126
124 126
124 126
124
126

PROVIDING A MALWARE ANALYSIS USING A SECURE MALWARE DETECTION PROCESS

BACKGROUND

Malware (such as viruses, trojans, and other malicious software) has become increasingly more difficult to contest. Various methods have been used to combat malware, but more sophisticated malware continues to abound. Methods of detection have grown more complex, but often take longer to execute due to this complexity. Malware protection processes applied in certain computer systems often lack the complexity or other sophistication to detect or otherwise address certain types of malware such as zero-day attacks and other types of malware.

SUMMARY

In certain embodiments, a computer-implemented system comprises a boundary controller and a first malware detection agent. The boundary controller is operable to implement a security boundary between a first computer network environment and a second computer network environment. The second computer network environment has a security classification level that is more restrictive than a security classification level of the first computer network environment. The boundary controller is operable to receive from the first computer network environment a file. The first malware detection agent is positioned in the second computer network environment and is operable to receive via the boundary controller the file and apply a first malware detection process on the file. The first malware detection process is subject to the security classification level of the second computer network environment.

In certain embodiments, a computer-implemented system comprises a boundary controller and a malware analysis system. The boundary controller is operable to implement a security boundary between a first computer network environment and a second computer network environment. The second computer network environment has a security classification level that is more restrictive than a security classification level of the first computer network environment. The boundary controller is operable to receive via the first computer network environment a file. The malware analysis system is positioned in the second computer network environment and is operable to receive via the boundary controller the file and apply a first malware detection process on the file. The first malware detection process is subject to the security classification level of the second computer network environment.

In certain embodiments, a computer-implemented system comprises a boundary controller and a first malware detection agent. The boundary controller is operable to implement a security boundary between a first computer network environment and a second computer network environment. The second computer network environment has a security classification level that is more restrictive than a security classification level of the first computer network environment. The boundary controller is operable to receive from a malware analysis system, at least a portion of which is positioned in the first computer network environment, a file. The first malware detection agent is positioned in the second computer network environment and is operable to receive via the boundary controller the file and apply a first malware detection process on the file. The first malware detection process is subject to the security classification level of the second computer network environment.

Particular embodiments of the present disclosure may provide one or more technical advantages. Certain embodiments allow files having a first security classification level to be analyzed for malware using a malware detection process that is subject to a second, more restrictive security classification level. For example, certain embodiments allow unclassified files (e.g., emails) to be analyzed for malware using classified malware detection processes. The files may be collected in a computing environment having a first security level, while the malware detection process may be maintained and/or applied to the file in a computing environment having a second, more restrictive security level.

Certain embodiments of the present disclosure may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Figure 1:
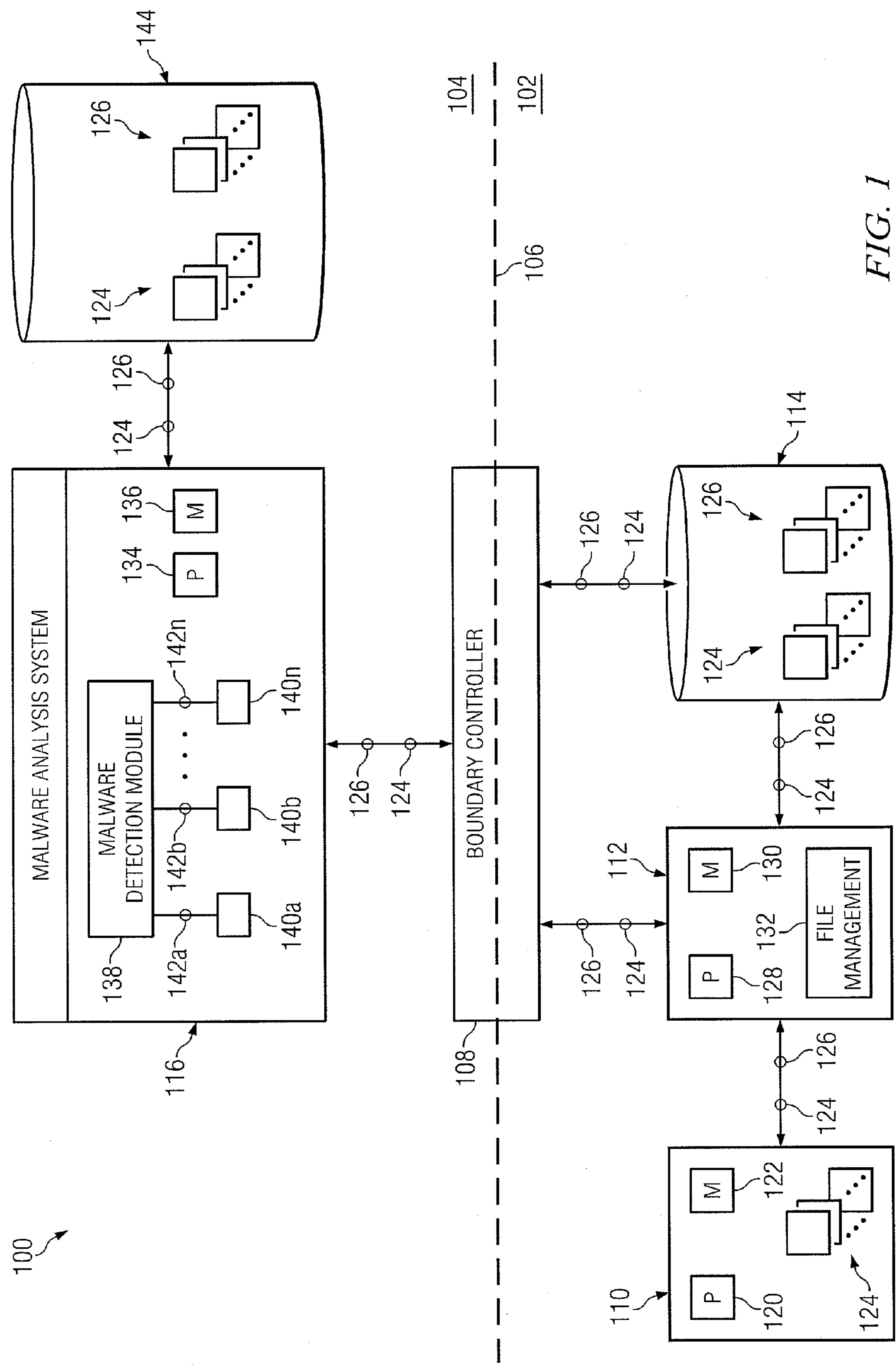
FIG. 1 illustrates an example system for providing a malware analysis using a secure malware detection process, according to certain embodiments of the present disclosure.

FIG. 1 illustrates an example system 100 for providing a malware analysis using a secure malware detection process, according to certain embodiments of the present disclosure. In the illustrated example, system 100 includes a first computer network environment 102, a second computer network environment 104, a security boundary 106, a boundary controller 108, a first processing system 110, a second processing system 112, a first storage module 114, a malware analysis system 116, and a second storage module 118. Although system 100 is illustrated and primarily described as including particular numbers and types of components arranged in a particular manner, the present disclosure contemplates system 100 including any suitable numbers and types of components arranged in any suitable manner, according to particular needs.

It may desirable for files to be analyzed by a malware analysis system, such as malware analysis system 116. The malware analysis system may analyze files for malware using one or more malware detection processes. In some cases, one or more of those malware detection processes may be subject to a relatively high security classification level. As an example, a particular malware detection process may be considered "Classified," and as such, the logic for executing the malware detection process may be maintained in a computing environment (e.g., computer network environment 104) that is subject to an appropriate security level, which may be a relatively more restrictive security level than the security level of a computing environment in which the file is collected.

In general, certain embodiments of the present disclosure allow a file to be analyzed using a malware detection process that is subject to a higher security classification level than a security classification level of an environment in which the file is collected. The file may be made available to a malware analysis system 116 for a malware analysis to be performed on the file. Malware analysis system 116 may analyze the file for malware, possibly by applying one or more malware detection processes, one or more of which may be subject to a relatively more restrictive security classification level that the security classification level of a computer network environment in which the file is collected. In the illustrated example of FIG. 1, malware analysis system is positioned in computer network environment 104. In certain embodiments, an example of which is described below with reference to FIGS. 6-7, at least a portion of malware analysis system 116 is positioned in computer network environment 102. A boundary controller may enforce a security boundary between computer network environments of differing security classification levels (e.g., computer network environment 102 and computer network environment 104).

System 100 may include first and second computer network environments 102 and 104 separated by a security boundary 106. Computer network environment 102 may have a first security classification level, and computer network environment 104 may have a second security classification level. In certain embodiments, the security classification levels may be government security levels, though the present disclosure contemplates the security classification levels being any suitable types of security classification levels according to particular needs. As just one example, computer network environment 102 may be associated with a government security classification level of "Unclassified" while computer network environment 104 may be associated with a government security classification level of "Classified."

Example security classification levels that may be associated with computer network environments 102 and 104 may include protection levels defined by PROTECTING SENSITIVE COMPARTMENTED INFORMATION WITHIN INFORMATION SYSTEMS (DCID 6/3)—MANUAL, dated May 24, 2000, Director of Central Intelligence Directive. Other examples of security classification levels that may be associated with computer network environments 102 and 104 may include those mentioned by the Department of Defense Information Assurance Certification and Accreditation Process (DIACAP). In certain embodiments, computer network environments 102 and/or 104 may be implemented using the Secret Internet Protocol Router Network (SIPRNet) and/or the Non-classified Internet Protocol Router Network (NIPRNet). Other example security classification levels that may be associated with computer network environments 102 and 104 include internal networks (e.g., an intranet), secret networks, top secret networks, Automated Teller Machine networks, and bank networks, some of which may overlap. In certain embodiments, the components of system 100 may be divided into more than two computer network environments having different security classification levels.

In certain embodiments, the security classification level of computer network environment 104 may be more restrictive than the security classification level of computer network environment 102. A more restrictive security classification level may be what is generally perceived as a higher security classification level. For example, in certain embodiments, data available in a computer network environment having a more restrictive classification level may be accessible to relatively fewer entities that data available in a computer network environment having a lower security classification level and/or may require more stringent authentication to be accessed. As just one particular example, the security classification level of computer network environment 102 may be "Unclassified" while the security classification level of computer network environment 104 may be "Classified."

Each computer network environment 102 and 104 may include links that facilitate wireless or wireline communication. These links may communicate, for example, IP packets, Frame Relay frames, Asynchronous Transfer Mode (ATM) cells, voice, video, data, and other suitable information between network addresses. Each computer network environment 102 and 104 may include any suitable combination of local area networks (LANs), radio access networks (RANs), metropolitan area networks (MANs), wide area networks (WANs), mobile networks (e.g., using WiMax (802.16), WiFi (802.11), 3 G, 4 G, or any other suitable wireless technologies in any suitable combination), all or a portion of the global computer network known as the Internet, and/or any other communication system or systems at one or more locations, any of which may be any suitable combination of wireless and wireline.

Security boundary 106 may be implemented, at least in part, by a boundary controller 108. In certain embodiments, boundary controller 108 is capable of enforcing a security boundary between computer network environments having different security classification levels. In certain embodiments, communication between computer network environment 102 and computer network environment 104 passes through boundary controller 108. Boundary controller 108 may include a controlled interface that implements and/or enforces security boundary 106 between computer network environments (e.g., 102 and 104). Boundary controller 108 may facilitate the distribution of information between computer network environments of varied security classification levels, provide effective interoperability between computer network environments of varied security classification levels, and/or serve as a link to ensure that data maintains sensitivity levels in information-sharing and transmission processes that occur between computer network environments of varied security classification levels. Boundary controller 108 may provide certain aspects of memory and processing isolation between data that is received from different network interfaces. Boundary controller 108 may include parallel computer architecture, such as processors, memory modules, and disk storage modules to provide this isolation. Boundary controller 108 may be implemented using any suitable combination of hardware, firmware, and software.

In certain embodiments, boundary controller 108 may be a guard, a firewall, or any other suitable barrier adapted to separate computers and/or computer network environments having different security classification levels. As just one particular example, boundary controller 108 may be a RAYTHEON HIGH-SPEED GUARD. In certain embodiments, boundary controller 108 is a unidirectional network appliance, data diode, or other suitable device enforcing a unidirectional network such that connections across the boundary controller 108 are permitted in one direction but prohibited in the other direction. For example, boundary controller 108 may permit certain communications from the computer network environment 102 to computer network environment 104 (processed according to the security mechanisms of boundary controller 108), and prohibit certain (or possibly all) communications from computer network environment 104 to computer network environment 102. Additionally or alternatively, boundary controller 108 may permit communications in multiple directions.

Boundary controller 108 may interact with one or more boundary control subsystems or other suitable modules to facilitate implementation of the operations of boundary controller 108. These subsystems may include, for example, firewalls, intrusion detection systems, gateways (such as a Layer 7 Gateway), authentication modules, and/or other suitable security frameworks.

System 100 may include a first processing system 110, which may be positioned in computer network environment 102. Processing system 110 may be one of a number of processing systems 110. Processing system 110 may include a processing unit 120 and a memory unit 122. Processing unit 120 may include one or more microprocessors, controllers, or any other suitable computing devices or resources. Processing unit 120 may work, either alone or with other components of system 100, to provide a portion or all of the functionality of its associated processing system 110 described herein. Memory unit 122 may take the form of volatile or non-volatile memory including, without limitation, magnetic media, optical media, read-access memory (RAM), read-only memory (ROM), removable media, or any other suitable memory component.

Processing system 110 may receive, store, generate, and/or otherwise process one or more files 124. Files 124 may have any suitable format, according to particular needs. For example, file 124 may include one or more of the following in any suitable combination: (1) a data file; (2) a data record; (3) an email message; (4) an attachment to an email message; (5) a Uniform Resource Locator (URL) or other suitable address identifier; and (6) any other suitable target object for which malware detection may be appropriate. In some embodiments, the term file as used herein may refer to a collection of files. For example, a ZIP file or other archive or compressed file type may include multiple embedded files. The present disclosure contemplates processing systems 110 and 112 having any suitable number of files 124 and requesting that malware analysis system 116 perform a malware analysis of any suitable number of files 124.

Processing system 110 may be operable to communicate one or more files 124 to processing system 112, described below. Processing system 110 may communicate files 124 to processing system 112 for any suitable reason. For example, processing system 110 may determine (e.g., based on one or more policies) that a malware analysis should be performed on file 124 and may communicated a malware analysis request, along with file 124, to processing system 112. In certain embodiments, rather than communicating files 124 and/or malware analysis requests to processing system 112, processing system 110 may communicate such files 124 and/or malware analysis requests directly to boundary controller 108 and/or storage module 114, if appropriate.

Processing system 102 may be operable to receive results of a malware analysis of file 124 (e.g., as results 126), if appropriate. Results 126 may be communicated by any suitable combination of boundary controller 108, processing system 112, or malware analysis system 116. Additionally or alternatively, processing system 110 may access results 126 from storage module 114. In certain embodiments, results 126 may include an indication of whether or not a file 124 submitted to be analyzed for malware is determined by malware analysis system 116 to be malware.

System 100 may include a second processing system 112. Processing system 112 may be one of a number of processing systems 112. Processing system 112 may include a processing unit 128 and a memory unit 130. Processing unit 128 may include one or more microprocessors, controllers, or any other suitable computing devices or resources. Processing unit 128 may work, either alone or with other components of system 100, to provide a portion or all of the functionality of its associated processing system 112 described herein. Memory unit 130 may take the form of volatile or non-volatile memory including, without limitation, magnetic media, optical media, RAM, ROM, removable media, or any other suitable memory component.

Processing system 112 may receive files 124 from processing system 110 and may perform any suitable processing on the received files 124. In certain embodiments, processing system may provide any suitable combination of email processing infrastructure, border protection and/or gateway management, message filtering, data loss protection, policy and routing, and other suitable operations. Although described as a message processing appliance, processing system 112 may be any suitable system for processing files 124. In certain embodiments, processing system 112 comprises one or more SENTRION message processing systems (currently manufactured and sold by SENDMAIL) or other message processing appliance.

In certain embodiments, processing system 112 determines whether the file 124 should be analyzed for malware and, if processing system 112 determines that the file 124 should be analyzed for malware, makes the file 124 available to boundary controller 108 for a malware analysis to be performed on the file 124 by malware analysis system 116. For example, processing system 112 may communicate the file 124 to boundary controller 108 and/or store the file 124 in storage module 114. In certain embodiments, malware analysis system 116 may be implemented as a web service, and processing system 112 or another suitable component may make a web services call to maiware analysis system 116 to request that maiware analysis system 116 perform a maiware analysis of one or more files 124.

In certain embodiments, such as when files 124 are emails and/or email attachments, processing system 112 may receive and process the files 124 before those files 124 are delivered to processing system 110. In such embodiments, some files 124 for which processing system 112 requests a malware analysis may not be files 124 received from processing system 110 but may be files received by processing system 112 from another suitable source for delivery to processing system 110.

Processing system 112 may include a file management module 132, which may be implemented using any suitable combination of hardware, firmware, and software. File management module 132 may include any suitable application (or combination of applications) that is operable to process files 124 and communicate some or all of those files 124 to one or more of boundary controller 108 and storage module 114. For example, file management module 132 may receive files 124

(e.g., from processing system 110 or another suitable source) and determine whether to communicate those files 124 to boundary controller 108 and/or storage module 114. File management module 132 may formulate a maiware analysis request that includes file 124, if appropriate. In certain embodiments, file management module 132 is operable to access one or more policies to determine whether to communicate file 124 for malware analysis system 116 to perform a malware analysis of file 124. For example, these policies may filter which files 124 are communicated to boundary controller 108 and/or storage module 114 to be made available to malware analysis system 116 for a malware analysis to be performed. In certain embodiments, file management module 132 may also process results 126. File management module 132 may perform any other suitable tasks, according to particular needs.

System 100 may include a storage module 114 positioned in computer network environment 102. Storage module 114 may take the form of volatile or non-volatile memory including, without limitation, magnetic media, optical media, RAM, ROM, removable media, or any other suitable memory component. In certain embodiments, a portion of all of storage module 114 may include a database, such as one or more structured query language (SQL) servers or relational databases. Additionally or alternatively, in certain embodiments, a portion or all of storage module 114 may include non-relational storage, such as an APACHE HADOOP-based database or other object store. Storage module 114 may be a part of or distinct from a memory unit 130 of processing system 112 or another suitable component of system 100.

Storage module 114 may store a variety of information that may be used by processing system 112, boundary controller 108, and/or other suitable components of system 100. In certain embodiments, storage module 114 stores files 124. For example, storage module 114 may store some or all of the files 124 that processing system 112 receives. In certain embodiments, storage module 114 stores results 126, which may represent the results of the malware analysis of files 124 performed by malware analysis system 116. Although storage module 114 is described as including particular information, storage module 114 may store any other suitable information. Furthermore, although particular information is described as being stored in storage module 114, the present description contemplates storing this information in any suitable location, according to particular needs.

Boundary controller 108 may receive via boundary controller 108 files 124 for analysis by malware analysis system 116. Boundary controller 108 may proactively pull files 124 from storage module 114 (e.g., in an asynchronous transfer mode). Additionally or alternatively, storage module 114 may proactively communicate files 124 to boundary controller 108. In certain embodiments, processing system 110 and/or 112 may communicate files directly to boundary controller 108 with or without storing those files 124 in storage module 114.

Boundary controller 108 may perform any suitable processing of files 124 (and/or requests associated with files 124). In certain embodiments, boundary controller 108 may determine whether to make files available to malware analysis system 116. For example, boundary controller 108 may access one or more policies to determine whether to make files 124 available to malware analysis system 116. In certain embodiments, boundary controller 108 may perform a validation of file 124 before making file 124 available to malware analysis system 116. This validation may be a part of boundary controller 108's enforcement of security boundary 106. For example, boundary controller 108 may perform the validation to help ensure that file 124 is appropriate for and is in condition for delivery into computer network environment 104 given computer network environment 104's relatively more restrictive security classification level.

System 100 includes malware analysis system 116, which in this example is positioned in computer network environment 104. Malware analysis system 116 may include a processing unit 134 and a memory unit 136. Processing unit 134 may include one or more microprocessors, controllers, or any other suitable computing devices or resources. Processing unit 134 may work, either alone or with other components of system 100, to provide a portion or all of the functionality of its associated malware analysis system 116 described herein. Memory unit 136 may take the form of volatile or non-volatile memory including, without limitation, magnetic media, optical media, RAM, ROM, removable media, or any other suitable memory component.

Malware analysis system 116 may include any processing system operable to analyze one or more files 124 for malware. For example, malware analysis system 116 may analyze files 124 for malware in response to a malware analysis request from processing systems 110 and/or 112. Malware analysis system 116 may include a malware detection module 138 that is operable to implement some or all of the functionality of malware analysis system 116. Malware detection module 138 may be implemented using any suitable combination of hardware, fl and software.

Malware analysis system 116 may receive via boundary controller 108 files 124 for analysis. Malware analysis system 116 may proactively pull files 124 from boundary controller 108. Additionally or alternatively, boundary controller 108 may proactively communicate files 124 to malware analysis system 116.

In certain embodiments, malware analysis system 116 may identify a file 124 as being and/or containing (terms and their variations of which may be used interchangeably throughout this disclosure) malware if the file 124 includes any of a variety of forms of hostile or intrusive computer-readable logic designed to infiltrate a computer system. Particular foams of malware may include computer viruses, worms, trojan horses, spyware, adware, scareware, crimeware, rootkits, and other malicious and/or unwanted software. Malware may be designed to disrupt or deny operation of a computer system, gather information from a computer system (e.g., that leads to a loss of privacy or exploitation), gain unauthorized access to computer system resources, or engage in other abusive behavior.

Malware analysis system 116 may perform a malware analysis of file 124 in any suitable manner, according particular needs. In certain embodiments, malware analysis system 116 may be operable to apply one or more malware detection processes on files 124 and determine a status of the files 124. Applying a malware detection process to a file 124 may include running one or more malware detection algorithms or other suitable tasks on the file 124.

In certain embodiments, malware analysis system 116 is operable to apply a malware detection process to a file 124 by invoking a malware detection agent 140 that is operable to analyze the file 124 using the malware detection process. For example, malware detection module 138 may invoke one or more malware detection agents 140 for analyzing file 124 for malware. Each malware detection agent 140 may apply a corresponding malware detection process to analyze file 124 for malware. In certain embodiments, malware analysis system 116 may invoke multiple malware detection agents 140, each operable to apply a corresponding malware detection process on the file 124, for analyzing a file 124 for malware.

Each malware detection agent 140 may return a corresponding output 142 indicating a result of the malware detection process the malware detection agent 140 applied to file 124. In certain embodiments, the output 142 may provide an indication of whether the file is known to be malware, is known not to be malware, might be malware, or some other suitable indicator.

In certain embodiments, malware detection module 138 may be considered the centralized organizer of malware analysis system 116. For example, malware detection module 138 may be responsible for ingesting files 124, scheduling a malware analysis of those files 124, determining a malware disposition of files 124, consulting a human analyst, and performing any other suitable operations. In certain embodiments, to determine a malware disposition of file 124, malware detection module 138 may determine one or more appropriate malware detection agents 140 for analyzing file 124, invoke the determine one or more malware detection agents 140 to analyze file 124, receive or otherwise access corresponding outputs 142 from the one or more invoked malware detection agents 140, and use some or all of the received outputs 142 to determine a status or other disposition of file 124. If appropriate, malware detection module 138 may make any suitable combination of file 124 and the one or more outputs 142 available to a human analyst (e.g., using analysis console 210, described in greater detail below with reference to FIGS. 2-3) to assist in formulating the disposition of file 124.

Applying the one or more malware detection processes on a file 124 accessed by malware analysis system 116 may, in certain instances, result in a detection of malware. Malware detection by malware analysis system 116 may conclusively indicate that the file 124 or files 124 in question are known not to contain malware. Malware detection by malware analysis system 116 may conclusively indicate that the file 124 or files 124 in question are known to contain malware. Alternatively, malware detection by malware analysis system 116 may indicate that the file 124 or files 124 in question are suspected of malware, though such detection may not conclusively indicate that the file 124 or files 124 are known to contain malware. These and other example statuses are described in greater detail below.

In the illustrated example, malware analysis system 116 is positioned in computer network environment 104, which is subject to a different, more restrictive security classification level than computer network environment 102. As described above, one or more of the malware detection processes applied by malware analysis system 116 may be subject to a higher security classification level than the security classification level of file 124. For example, file 124 may be subject to a security classification level associated with computer network environment 102 while one or more of the malware detection processes applied by malware analysis system 116 may be subject to the security classification level of computer network environment 104, the security classification level of computer network environment 104 being more restrictive that the security classification level of computer network environment 102. For example, malware analysis system 116 may invoke one or more malware detection agents 140 that are operable to analyze the file 124 using one or more malware detection processes that are subject to the security classification level of computer network environment 104.

Additionally or alternatively, in certain embodiments, malware analysis system 116, positioned in computer network environment 104, may apply one or more malware detection processes that are not subject to the more restrictive security classification level of computer network environment 104. For example, malware analysis system 116 may invoke one or more malware detection agents 140 that are operable to analyze file 124 using one or more malware detection processes that are not subject to the security classification level of computer network environment 104. In other words, even though the security classification level of computer network environment 102 (or an even lower security classification level) would be sufficient for certain of the applied malware detection processes, in certain embodiments, malware analysis system 116 may still apply those malware detection processes in computer network environment 104.

In certain embodiments, malware analysis system 116 may generate a result 126 indicating a result of the malware analysis of the file 124 or files 124 performed by malware analysis system 116. Result 126 may include an indication of the determined malware status or other disposition of file 124, as determined by malware analysis system 116. Malware analysis system 116 may return the results (e.g., as a results 126) of the analysis of the files 124 for malware to processing system 110 and/or processing system 112 via boundary controller 108. For example, in response to performing a malware analysis of file 124 by applying one or more malware detection processes to file 124, malware analysis system 116 may communicate a malware analysis result 126 from computer network environment 104 to computer network environment 102 via boundary controller 108.

System 100 may include a storage module 144 positioned in computer network environment 104. Storage module 144 may take the form of volatile or non-volatile memory including, without limitation, magnetic media, optical media, RAM, ROM, removable media, or any other suitable memory component. In certain embodiments, a portion of all of storage module 144 may include a database, such as one or more SQL servers or relational databases. Additionally or alternatively, in certain embodiments, a portion or all of storage module 144 may include non-relational storage, such as an APACHE HADOOP-based database or other object store. Storage module 144 may be a part of or distinct from a memory unit 136 of malware analysis system 116 or another suitable component of system 100.

Storage module 144 may store a variety of information that may be used by malware analysis system 116 and/or other suitable components of system 100. In certain embodiments, storage module 144 stores some or all of the files 124 that malware analysis system 116 receives (e.g., via boundary controller 108) for analysis. Additionally or alternatively, storage module 144 may store results 126 of the malware analysis performed by malware analysis system 116. Although storage module 144 is described as including particular information, storage module 144 may store any other suitable information. Furthermore, although particular information is described as being stored in storage module 144, the present description contemplates storing this information in any suitable location, according to particular needs.

Components of system 100 (e.g., computer network environment 102, computer network environment 104, boundary controller 108, processing system 110, processing system 112, storage module 114, malware analysis system 116, storage module 144, and any other suitable components of system 100) may be implemented using any suitable combination of hardware, firmware, and software. Each component may include one or more computer systems or other processing systems at one or more locations. Each processing system may include any appropriate input devices, output devices, mass storage media, processors, memory, or other suitable components for receiving, processing, storing, and communicating data. For example, each processing system may include a personal computer, workstation, network computer, kiosk, wireless data port, personal data assistant (PDA), one or more Internet Protocol (IP) telephones, one or more cellular/smart phones, one or more servers, a server pool, a network gateway, a router, a switch, one or more processors within these or other devices, or any other suitable processing device. Each component may be a stand-alone computer or may be a part of a larger network of computers associated with an entity. Additionally references to a component and a user of a component may be used interchangeably throughout this description.

Particular embodiments of the present disclosure may provide one or more technical advantages. Certain embodiments allow files 124 having a first security classification level to be analyzed for malware using a malware detection process that is subject to a second, more restrictive security classification level. For example, certain embodiments allow unclassified files 124 (e.g., emails) to be analyzed for malware using classified malware detection processes. The files 124 may be collected in a computing environment having a first security level (e.g., computer network environment 102), while the malware detection process may be maintained and/or applied to the file 124 in a computing environment having a second, more restrictive security level (e.g., computer network environment 104).

Figure 2:
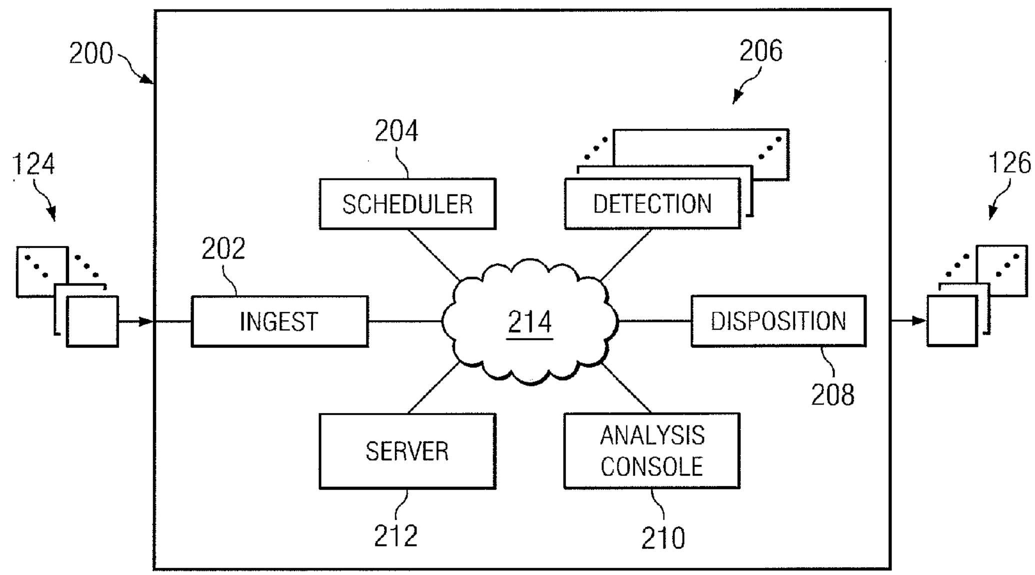
FIG. 2 illustrates an example malware analysis system, according to certain embodiments of the present disclosure.

FIG. 2 illustrates an example malware analysis system 200, according to certain embodiments of the present disclosure. Malware analysis system 200 provides just one example of how malware analysis system 116 (or a portion of malware analysis system 116) may be implemented. Although this particular example implementation of malware analysis system 116 is illustrated and described, the present disclosure contemplates implementing malware analysis system 116 in any suitable manner, according to particular needs. In the illustrated example, malware analysis system 200 includes ingest module 202, scheduler module 204, detection module 206, disposition module 208, analysis console 210, and server module 212.

Modules 202-212 may communicate between or among each other via one or more internal networks 214, referred to for simplicity in the singular. Internal network 214 facilitates wireless or wireline communication. Internal network 214 may communicate, for example, IP packets, Frame Relay frames, ATM cells, voice, video, data, and other suitable information between network addresses. Internal network 214 may include one or more LANs, RANs, MANs, WANs, mobile networks (e.g., using WiMax (802.16), WiFi (802.11), 3 G, 4G, or any other suitable wireless technologies in any suitable combination), all or a portion of the global computer network known as the Internet, and/or any other communication system or systems at one or more locations, any of which may be any suitable combination of wireless and wireline. In certain embodiments, internal network 214 includes a system bus. Malware analysis system 200 may communicate with an external network, which in certain embodiments may be a portion of one or more of computer network environments 102 and 104 of FIG. 1.

Modules 202-212 may be implemented using any suitable combination of hardware, firmware, and software. For example, modules 202-212 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more cellular/smart phones, one or more servers, a server pool, one or more processors within these or other devices, or any other suitable processing device. Modules 202-212 may be a stand-alone computer or may be a part of a larger network of computers associated with an entity.

Modules 202-212 may include one or more processing units and one or more memory units. Each processing unit may include one or more microprocessors, controllers, or any other suitable computing devices or resources. Each processing unit may work, either alone or with other components of system 200, to provide a portion or all of the functionality of its associated computer system described herein. Each memory unit may take the form of a suitable combination of volatile and non-volatile memory including, without limitation, magnetic media, optical media, RAM, ROM, removable media, or any other suitable memory component.

In certain embodiments, the implementation and/or operation of modules 202-212 is implemented generally as follows. Ingest module 202 may access a file 124 and determine one or more malware detection processes that should be applied to file 124 to determine whether file 124 is suspected of malware. In certain embodiments, ingest module 202 may invoke one or more detection modules 206 to apply the determined one or more malware detection processes on file 124. In response, one or more detection modules 206 may apply the malware detection processes that were determined by ingest module 202 in accordance with scheduling performed by scheduler module 204. Detection modules 206 may correspond to malware detection agents 140, described herein. Disposition module 208 uses the results of the malware detection processes performed by detection module 206 to determine whether file 124 should be sent to server module 212 for quarantine purposes while a second analytical stage for file 124 is processed (e.g., at analysis console 210). Further details regarding the implementation and/or operation of modules 202-212 are described below.

Ingest module 202 may be operable to extract and cause to be analyzed file 124 accessed by malware analysis system 200. Ingest module 202 may analyze file 124 and determine one or more malware detection processes that should be applied to file 124 to determine whether file 124 is suspected of malware. In certain embodiments, ingest module 202 may be configured to determine a type of a file ingest module 202 receives. For example, ingest module 202 may examine an extension associated with the file name of file 124 to determine the type of the file. As another example, ingest module 202 may examine portions of the file content of file 124 to determine its type. Ingest module 202 may examine characters in a header of file 124 to determine its type. Such characters may be referred to as magic numbers or magic bits. In this manner, in certain embodiments, ingest module 202 may detect the correct type of file 124 even if the extension of the filename of file 124 has been removed or changed (e.g., falsified). As another example, for certain types of files 124 (e.g., MICROSOFT OFFICE files), ingest module 202 may determine the file type based on both magic number(s) and the file extension, possibly examining the magic number(s) prior to examining the file extension.

In certain embodiments, ingest module 202 may determine whether file 124 has been previously analyzed for malware. Ingest module 202 may use one or more techniques to determine if file 124 has been previously analyzed for malware. For example, ingest module 202 may generate one or more hashes of content of file 124 (such as a checksum, an MD5 hash, and/or a SHA 1 hash). These value(s) may be compared to a database containing hash values of previously analyzed files 124. If the hash value is found in data storage, ingest module 202 may determine that file 124 has been previously analyzed. If the hash value is not present in data storage, ingest module 202 may determine that file 124 has not been previously analyzed. In certain embodiments, ingest module 202 may use the name of file 124 and/or its extension, as well as variations on those items, to determine if file 124 has been previously analyzed.

In certain embodiments, if it is determined that file 124 has been analyzed previously, malware detection processes may not be applied to file 124; instead, the results of the previous analysis of file 124 may be determined using a database (e.g., storage module 144) that contains results (e.g., results 126) of a previous analysis of file 124. If the results indicate that file 124 is known not to be malware, then the analysis of file 124 may end. If it is determined that file 124 was previously determined to be malware, then it may be determined that file 124 should be quarantined. If it is determined that file 124 has been previously received and is currently being analyzed (e.g., possibly including review by human analysts associated with analysis console 210), then action may be taken once the outcome of the ongoing analysis is known. In certain embodiments, this ability to check whether a file 124 previously has been analyzed previously may allow for more efficient use of the resources that perform the malware detection schemes on the files 124 and may reduce the workload of a machine and/or human analyst.

While in this example, ingest module 202 is described as generating the information (e.g., the one or more hashes) used to determine whether file 124 has been previously analyzed, in certain embodiments, the sender of file 124 (e.g., processing system 110 and/or processing system 112) may generate this information and communicate this information to malware analysis system 116 (e.g., to ingest module 202). For example, prior to or in addition to sending the actual file 124 to malware analysis detection system 108, the sender of file 124 may send this information to malware analysis system 116 so that malware analysis system 116 can determine whether file 124 previously has been analyzed for malware. If malware analysis system 116 determines that file 124 has not been analyzed previously for malware, then (if file 124 was not sent previously) malware analysis system 116 may request that the sender send the actual file 124 for analysis.

In certain embodiments, ingest module 202 may be used to determine whether file 124 should undergo malware detection and/or which malware detection schemes should be applied. For example, ingest module 202 may determine that a file 124 received by ingest module 210 is a plain text file. Ingest module 202 then may retrieve one or more policies associated with plain text files. A retrieved policy may indicate that plain text files are not to be analyzed for malware. As a result, the plain text file 124 may be ignored. As another example, ingest module 202 may determine that a file 124 is a document created by the MICROSOFT WORD application. Ingest module 202 may then retrieve one or more policies associated with MICROSOFT WORD documents. Ingest module 202 may examine the retrieved policy or policies and determine that the received file 124 should be analyzed for malware. Ingest module 202 may also examine the retrieved policy or policies and determine the malware detection schemes that should be applied to the MICROSOFT WORD document. Ingest module 202 then may create and store entries in data storage consistent with the determined malware detection schemes.

Scheduler module 204, in certain embodiments, may determine the order in which malware detection processes are performed. Scheduler module 204 may assign processes to various computing resources of malware analysis system 200 using any suitable method. For example, scheduler module 204 may use a first-in-first-out (FIFO) algorithm to assign processes. Processes may also be prioritized. For example, scheduler module 204 may use a FIFO approach to schedule jobs initially, but it may be determined to prioritize one job over another in response to results provided by the detection nodes. Schedule policies may be used by scheduler module 204 to determine how to schedule jobs and how to prioritize jobs. Priorities for jobs, in certain embodiments, may also be determined based on the context associated with the file 124. For example, if the file 124 undergoing analysis was part of an e-mail attachment, it may be prioritized higher than other files 124.

In certain embodiments, policies used by scheduler module 204 may be modified when a new malware detection process is added. Information may be entered regarding how to apply the malware detection process. For example, such information may be entered using a tabbed interface, a wizard-style interface, or other interfaces for entering information. The information entered may include how jobs should be prioritized, the context associated with file 124, which malware detection agents 140 are involved in implementing the malware detection process, and/or other items associated with applying a malware detection process.

Detection modules 206, in certain embodiments, may be operable to perform the malware detection processes that were determined by ingest module 202 in accordance with scheduling performed by scheduler module 204. For example, detection modules 206 may correspond to malware detection agents 140 described herein. Each detection module 206 may implement one or more corresponding malware detection processes that may be applied to files 124. In certain embodiments, detection module 206 may conform to an interface standard for applying malware detection. Such an interface may include standards for one or more of the following: specifying file 124 (including, possibly, a URL) that is to be analyzed configuration parameters for applying the detection process, time limit for completing the analysis, format of results, specifying the reason for indicating that an analyzed item is suspect, providing log files, and other suitable items involved with applying malware detection processes.

In certain embodiments, having such an interface may be advantageous because it may allow policies to call for the application of malware detection processes without having to give precise parameters based on the configuration of the detection node. In this manner, in certain embodiments, new detection processes may be added to the system without needing to recode various parts of the system since the detection node applying the new malware detection process would conform to the interface standard. For example, to add a new malware detection process, the detection node applying the new malware detection process may be configured to conform to the interface standard by being configured to receive files 124 for analysis in the same or similar manner as other configuration nodes applying other malware detection processes. In addition, for example, the configuration node applying the new malware detection process may be configured to report the results of applying the new malware detection process in the same or similar manner as other configuration nodes applying other malware detection processes. This may allow malware analysis system 200 to adapt to new malware detection processes.

Detection module 206 may be implemented on a variety of types of hardware. For example, detection module 206 may be configured in a blade architecture or on physical hosts. Detection module 206 may be configured utilizing clusters or other suitable distributed computing architectures. Detection module 206 may use virtualization and/or may include virtual machines. Detection module 206 may be used to apply a variety of malware detection processes to a file 124 (which, in certain embodiments, may include one or more URLs). In certain embodiments, detection module 206 may be specialized such that malware analysis system 200 may be configured to apply a type of malware detection process. For example, detection module 206 may be configured to apply behavior-based malware detection processes and/or metadata-based detection processes when metadata of file 124 is analyzed. In yet another example, detection module 206 may be configured to apply signature-based detection processes to files 124. As another example, detection module 206 may also apply classification-based detection processes. As described above, detection module 206 may be configured to apply other forms of detection processes that conform to an interface to facilitate the incorporation of new or different detection processes.

Disposition module 208, in certain embodiments, may be operable to use the results of the malware detection processes performed by detection modules 206 to determine what should be done with the file(s) 124. In certain embodiments, disposition module 208 may access the one or more results (e.g., outputs 142) received from detection module 206 (which may include a number of malware detection agents 140) and determine a status of file 124 based on those results. In some cases, disposition module 208 may characterize the file 124 as being suspected of malware. In response, malware analysis system 200 may send information corresponding to the file(s) 124 and/or actual content of the file(s) 124 (e.g., the file 124 itself) for further review at analysis console 210. In certain embodiments, disposition module 208 may respond to the results of detection module 206 regardless of whether it sends the file(s) 124 to analysis console 210. For example, disposition module 208 may determine that the file(s) 124 should be quarantined and send the file 124 to server module 212 to quarantine the file 124. In certain embodiments, disposition module 208 may determine that the file(s) 124 are not malware and may perform suitable corresponding actions. For example, disposition module 208 may indicate that it would be appropriate to release for delivery a message to which the analyzed file(s) 124 were attached, in response to the determination by disposition module 208 that the file(s) 124 are not malware.

Analysis console 210, in certain embodiments, is operable to facilitate malware analysis for files 124 that have been identified (e.g., by disposition module 208 or another suitable component of malware analysis system 200) as requiring further malware analysis. In certain embodiments, analysis console 210 may be operable to access information generated by disposition module 208 or another suitable component of malware analysis system 200, and to facilitate the propagation of a final disposition, if appropriate. The information propagated may include malware analysis outputs generated by analysis console 210, such that the recipient may benefit from the results of malware analysis performed using analysis console 210. In certain embodiments, the output of analysis console 210 is a status of file 124, which in certain embodiments may override any status determined by disposition module 208. Additional details of an example analysis console 210 are described below with respect to FIG. 3.

Server module 212 may include, for example, a file server, a domain name server, a proxy server, a web server, a computer workstation, or any other tangible device and associated logic operable to communicate with modules 230, 240, 250, 260, and/or 280 through network 220. Server module 212 may execute with any of the well-known MS-DOS, PC-DOS, OS-2, MAC-OS, WINDOWS™, UNIX, or other appropriate operating systems, including future operating systems. In certain embodiments, server module 212 may include one or more of the following in any suitable combination: a processor, data storage, a network interface, input functionality, and output functionality.

Figure 3:
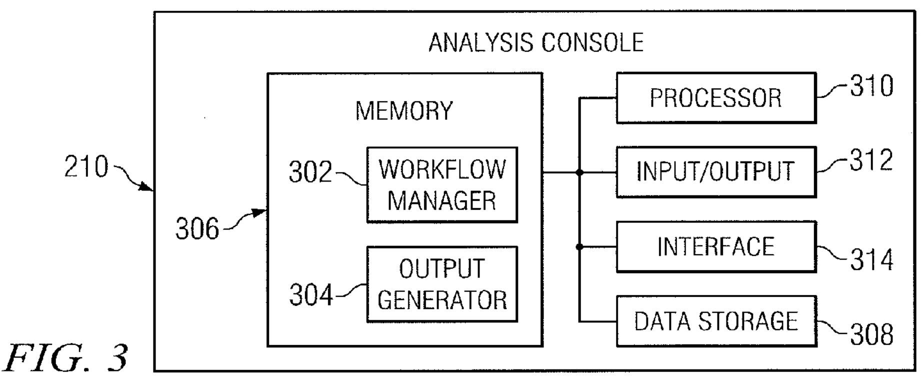
FIG. 3 illustrates an example analysis console, according to certain embodiments of the present disclosure.

FIG. 3 illustrates an example analysis console 210, according to certain embodiments of the present disclosure. As shown in FIG. 3, analysis console 210 includes a workflow manager 302 and an output generator 304 stored in computer-readable memory 306, data storage 308, processor 310, input/output functionality 312, and an interface 314. Workflow manager 302, output generator 304, memory 306, data storage 308, processor 310, input/output functionality 312, and interface 314 may be implemented using any suitable respective combination of hardware, firmware, or software. In certain embodiments, workflow manager 302, output generator 304, memory 306, data storage 308, processor 310, input/output functionality 312, and/or interface 314 may be capable of executing logic accessible to these components and/or stored therein. Although this embodiment includes workflow manager 302, output generator 304, memory 306, data storage 308, processor 310, input/output functionality 312, and interface 314, other embodiments may exclude one or more of these components without departing from the scope of the present disclosure.

In certain embodiments, workflow manager 302 may determine a workflow. A workflow is an ordered list of one or more tasks related to malware analysis. Execution of a workflow starts with a task in the list. Upon completion of a task, the active task calls the subsequent task in the ordered list using, for example, a defined API. When the final task of the workflow finishes, the workflow is complete. Certain workflows may facilitate malware analysis by a human analyst and/or by various analysis modules of analysis console 210. The information analyzed may correspond to a file 124 and/or may include actual content of the file 124.

In certain instances, the information to be analyzed may be presented to a human analyst for review based on a prior characterization of the file 124. For example, if malware analysis system 200 characterizes the file 124 as being suspected of malware, then a human analyst may review the file 124 to determine if it is in fact malware. As another example, if the file 124 is determined to be malware rather than merely to be suspected malware, a human analyst may review the file 124 to learn more about the malware in the file 124 and/or to start an incident response review (e.g., to clean up the file 124).

In such and other scenarios, workflow manager 302 may determine a workflow associated with reviewing the file 124. In certain embodiments, workflow manager 302 may generate a set of tasks to be performed by a human analyst reviewing the file 124 based on a variety of factors. Such factors could include the type of file 124 being reviewed and the characterization of the file 124 by malware analysis system 200. Other factors may include whether the system is operating in a passive, active, a hybrid passive/active mode, or another mode. For example, if operating in an active mode, a determination that the file 124 is suspected malware may invoke an advanced malware analysis workflow to be followed by a human analyst. As another example, if the file 124 is determined to be known malware, then workflows associated with cleaning up the environment(s) the file 124 has been in as well as other incident response workflows (e.g., notifying a user or an administrator) may be determined. Other suitable workflows may be generated based on these or other suitable factors.

In certain embodiments, workflow manager 302 may, automatically perform certain tasks to facilitate the review of the file 124 by the human analyst. For example, it may be determined that for a file 124 to be properly reviewed by a human analyst, all strings in the file 124 should be extracted. Workflow manager 302 may automate this extraction procedure. Workflow manager 302 may also provide a priority associated with the review of the file 124. For example, if it is determined that a file 124 has a higher probability of containing malware, then a higher priority may be assigned to the review of the file 124. Workflow manager 302 may also provide a display that enables the human analyst to review the workflow, the file 124 being analyzed, and/or information pertaining to that file 124.

Output generator 304, in certain embodiments, may be operable to generate a malware analysis output (a portion or all of which may be or may be included with result 126). In certain embodiments, the output may include an identifier of the file 124 or files 124 analyzed. For example, an identifier might include a hash of all or a portion of a file 124 analyzed at analysis console 210. The hash may be at least substantially equivalent to a hash generated by the ingest module 202 of the node 200 requesting the file 124 to be further analyzed for malware. Certain outputs generated by output generator 304 may include an indication of whether the file 124 (or files 124) analyzed at output generator 304 contain malware.

Memory 306 and data storage 308 may take the form of a suitable combination of volatile and non-volatile memory including, without limitation, magnetic media, optical media, RAM, ROM, removable media, or any other suitable memory component. Additionally, all or part of memory 306 and/or data storage 308 could reside locally within analysis console 210 or could reside at a location external but accessible to analysis console 210. Additionally, portions or all of memory 306 and data storage 308 may be combined, if appropriate.

Processor 310 may include one or more microprocessors, controllers, or any other suitable computing devices or resources. Each processor may work, either alone or with other components of analysis console 210, to provide a portion or all of the functionality of its associated computer system described herein. In certain embodiments, processor 310 may comprise the primary element or elements executing or realizing various logic-based functions, including, for example, the functions of workflow manager 302 and an output generator 304.

I/O functionality 312 may comprise, for example, any communication method of analysis console 210 (e.g., from an image buffer to a display). In certain embodiments, input functionality may comprise, for example, the receiving signals or data by analysis console 210. In other embodiments, output functionality may comprise, for example, the communication of signals or data by analysis console 210. These terms may also refer to part of an action, such as, for example, to "perform I/O" may involve performing an input and/or output operation. In some cases, one or more communication devices of analysis console 210 may be used to implement both input and output functionality.

Interface 314 may comprise, for example, any tangible device(s) that may be used (e.g., by a person, or by another device or system) to communicate with analysis console 210. For example, keyboards and mice may be considered input interfaces 314 of some analysis consoles 210, while monitors and printers may be considered output interfaces of some analysis consoles 210.

Figure 4:
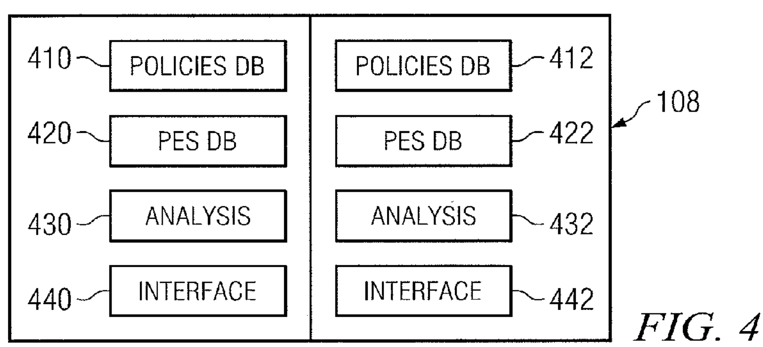
FIG. 4 illustrates additional details of the example boundary controller of FIG. 1, according to certain embodiments of the present disclosure.

FIG. 4 illustrates additional details of the example boundary controller 108 of FIG. 1, according to certain embodiments of the present disclosure. In this example, boundary controller 108 includes policies databases 410 and 412, policy enforcement service databases 420 and 422, analysis modules 430 and 432, and interfaces 440 and 442. Boundary controller 108 may use blocks 410, 420, 430, and 440 when receiving and analyzing communications from one computer network environment, such as computer network environment 102 of FIG. 1, and may use blocks 412, 422, 432, and 442 when receiving and analyzing communication with a different computer network environment, such as computer network environment 104 of FIG. 1. Interfaces 440 and 442 may be network interfaces for interacting with different computer network environments.

Databases 410, 412, 420, and 422 may be implemented using a variety of database structures. The databases may be row-oriented or column-oriented. They may include relational databases and/or object-oriented databases. Databases 410, 412, 420, and 422 may be indexed and accessed in a variety of manners, including by utilizing an operating system or through one or more networks. In certain embodiments, 410, 412, 420, and 422 may be implemented in one database such that separate tables within the database may be used to store the information contained in databases 410, 412, 420, and 422. In certain embodiments, the information in databases 410, 412, 420, and 422 may be stored using one or more files instead of databases, such as a set of flat files. In such cases, databases 410, 412, 420, and 422 may be implemented as one or more files instead of as databases. Further, although described as databases, the present disclosure contemplates databases 410, 412, 420, and 422 being implemented using any suitable combination of types of storage structures.

In certain embodiments, policies database 410 may include policies used by boundary controller 108 when analyzing messages from the computer network environment coupled to interface 440. In certain embodiments, those messages include files 124 and/or results 126. Similarly, policies database 412 may include policies used by boundary controller 108 when analyzing messages from the computer network environment coupled to interface 442. In certain embodiments, those messages include files 124 and/or results 126. Such policies may include what services should have been applied to the communication in order to validate the communication. The policies may also specify an order in which the services should be applied to the communication.

In certain embodiments, policy enforcement service database 420 includes information regarding policy enforcement services applied to messages from the computer network environment coupled to interface 440 (e.g., computer network environment 102). Similarly, policy enforcement service database 422 may include information regarding policy enforcement services applied to messages from the computer network environment coupled to interface 442 (e.g., computer network environment 104). Examples of information included in policy enforcement service databases 420 and 422 include identification information, network location information (such as addresses), encryption parameters, digital signatures, private and public keys, hash parameters, available services and other suitable information regarding policy enforcement services.

Analysis modules 430 and 432 may be implemented using any suitable combination of hardware, firmware, and software. Analysis module 430 may be used to analyze communication from interface 440 while analysis module 432 may be used to analyze communication from interface 442. In certain embodiments, those communications include files 124 and/or results 126. Analysis modules 430 and 432 may access one or more policies in policies database 410 and 412, respectively, after determining certain aspects of the communication they are each analyzing, such as the type of communication, the source of the communication, and/or the destination of the communication. The policies accessed may specify which services should have been applied to the communication and what results should have been generated due to the application of those services in order for the communication to be validated. Analysis modules 430 and 432 may use policy enforcement service databases 420 and 422, respectively, when they are each analyzing the communication to determine whether it complies with the policies retrieved from policies databases 410 and 412, respectively. For example, analysis modules 430 and 432 may use policy enforcement service databases 420 and 422 to decrypt information in the communications they are analyzing as well as verify that the identities of the policy enforcement services that have been applied to the communications they are analyzing.

Figure 5:
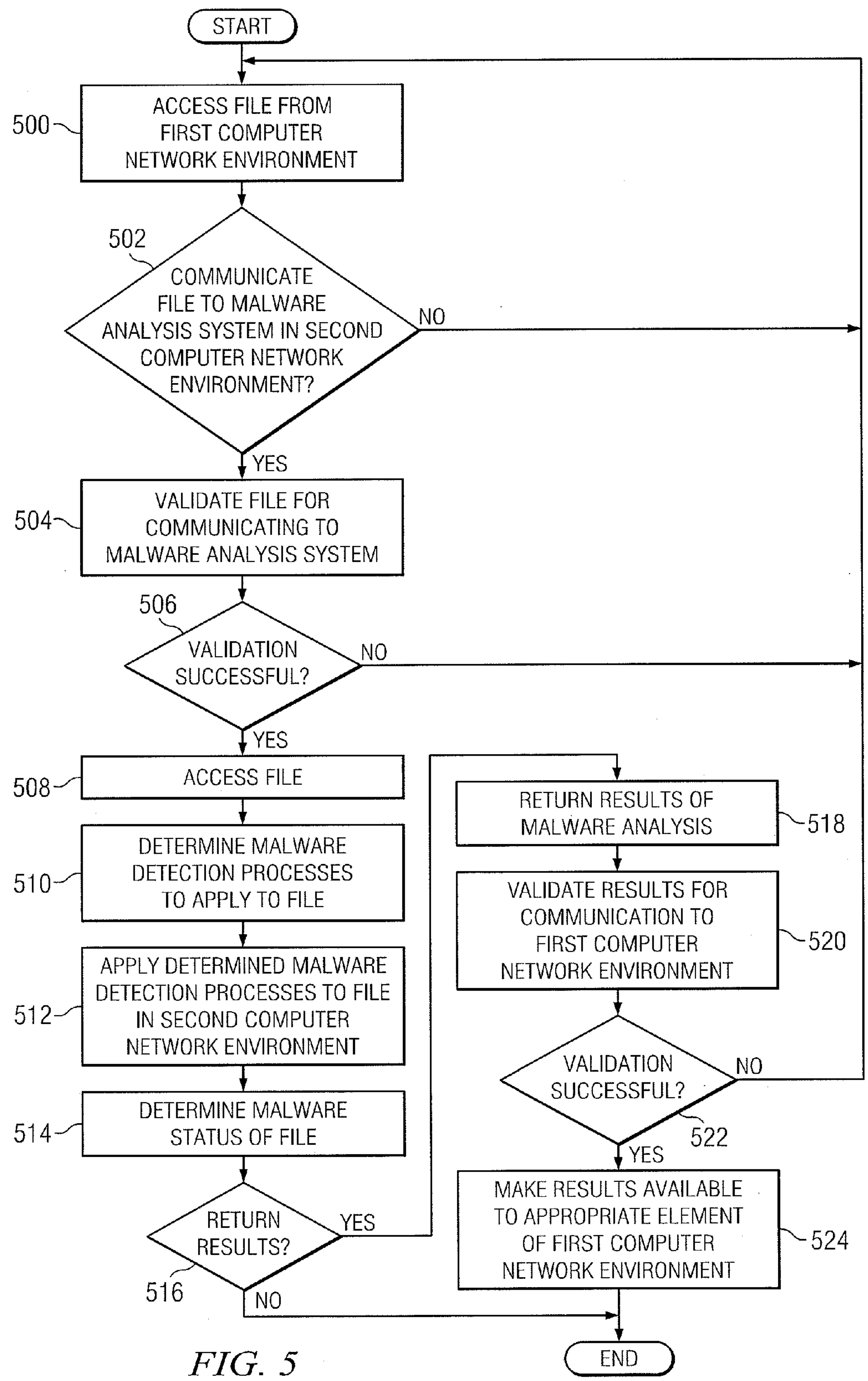
FIG. 5 illustrates an example method for providing a malware analysis using a secure malware detection process, performed using the example system described above with reference to FIG. 1.

FIG. 5 illustrates an example method for providing a malware analysis using a secure malware detection process, performed using the example system 100 described above with reference to FIG. 1. In this example, malware analysis system 116 is positioned in computer network environment 104 and is operable to apply in computer network environment 104 both malware detection processes that are subject to the more restrictive security classification level of computer network environment 104 and malware detection processes that are not subject to the more restrictive security classification level of computer network environment 104. For purposes of this example, references in FIG. 5 to the "first computer network environment" and the "second computer network environment" correspond to computer network environment 102 and computer network environment 104, respectively.

At step 500, boundary controller 108 may access file 124 from computer network environment 102. The present disclosure contemplates boundary controller 108 receiving file 124 or otherwise gaining access to file 124 from any suitable source and in any suitable manner, according to particular needs.

As just one example, processing system 112 may receive file 124. For example, processing system 112 may receive file 124 from processing system 110. As another example, processing system 112 may receive file 124 from another suitable source, the intended destination of the file 124 being processing system 110. Processing system 112 may determine whether to request a malware analysis of file 124. If processing system 112 determines not to request a malware analysis of file 124, then processing system 112 may await receipt of another file 124. If processing system 112 determines to request a malware analysis of file 124, then processing system 112 may store file 124 in storage module 114. Additionally or alternatively, processing system 112 may communicate file 124 (e.g., as part of a malware analysis request) to boundary controller 108.

In certain embodiments, boundary controller 108 proactively pulls file 124 from storage module 114 (e.g., in an asynchronous transfer mode). Additionally or alternatively, storage module 114 may proactively communicate file 124 to boundary controller 108. In certain embodiments, processing system 110 and/or 112 may communicate files directly to boundary controller 108 with or without storing those files 124 in storage module 114.

At step 502, boundary controller 108 may determine whether to communicate (or otherwise make available) file 124 to malware analysis system 116 positioned in computer network environment 104. For example, boundary controller 108 may access one or more policies to determine whether to communicate file 124 to malware analysis system 116. In certain embodiments, boundary controller 108 may perform this operation prior to proactively pulling file 124 from storage module 114. Additionally, although communication to malware analysis system 116 is primarily described, the present disclosure contemplates boundary controller 108 communicating file 124 to storage module 144 (which may or may not be a part of malware analysis system 114) or another suitable location if appropriate. If boundary controller 108 determines not to communicate (or otherwise make available) file 124 to malware analysis system 116, then the method may return to step 500 or another suitable step. If boundary controller 108 determines to communicate (or otherwise make available) file 124 to malware analysis system 116 (and/or storage module 144), then the method may proceed to step 504.

At step 504, boundary controller 108 may validate file 124 for communicating (or otherwise making available) to malware analysis system 116. Validating file 124 may include performing any suitable operations that boundary controller 108 may perform to enforce security boundary 106 and to ensure that file 124 is appropriate for delivery to malware analysis system 116.

At step 506, boundary controller 108 may determine whether the validation of file 124 at step 510 was successful. If boundary controller 108 determines that the validation of file 124 was not successful, then the method may return to step 500 or another suitable step. If boundary controller 108 determines that the validation of file 124 was successful, then the method may proceed to step 508.

At step 508, malware analysis system 116 may access file 124. For example, malware analysis system 116 may proactively pull file 124 from boundary controller 108. Additionally or alternatively, boundary controller 108 may proactively communicate file 124 to malware analysis system 116.

At step 510, malware analysis system 116 may determine one or more malware detection processes to apply to file 124. In certain embodiments, malware detection module 138 may determine one or more malware detection agents 140 to invoke for applying the one or more malware detection processes. Malware analysis system 116 may determine the one or more malware detection processes to apply to file 124 based on any suitable information, according to particular needs. For example, malware analysis system 116 may determine the one or more malware detection processes based on the type of file 124, the source of file 124, or any other suitable information.

One or more of the determined malware detection processes 124 may be subject to the security classification level of computer network environment 104 where malware analysis system 116 is positioned, while file 124 was collected in computer network environment 102. As described above, the security classification level of computer network environment 104 may be more restrictive than the security classification level of computer network environment 102.

At step 512, malware analysis system 116 may apply the determined one or more malware detection processes on file 124. For example, malware analysis system 116 (e.g., malware detection module 138) may invoke malware detection agents 140 that are each operable to analyze file 124 using a corresponding one (or more) of the determined one or more malware detection processes. In certain embodiments, malware analysis system 116 is operable to apply at least one malware detection process that is subject to the security classification level of computer network environment 104 and at least one malware detection process that is subject to security classification level of computer network environment 102 but not the security classification level of computer network environment 104. As just one particular example, the security classification level of computer network environment 102 may be "Unclassified" while the security classification level of computer network environment 104 may be "Classified."

At step 514, malware analysis system 116 may determine a malware status of file 124 based at least in part on the output of the applied one or more malware detection processes. For example, malware detection module 138 may receive the outputs 142 from the invoked one or more malware detection agents 140 and determine a malware status of file 124 based at least in part on the received outputs 142. In certain embodiments, a human reviewer may provide input into the malware status of file 124. For example, a human reviewer may use analysis console 210 to provide input into determining the malware status of file 124.

At step 516, malware analysis system 116 may determine whether to return results of the malware analysis of file 124. For example, malware detection module 138 may determine whether to return the results based on one or more policies. In certain embodiments, boundary controller 108 is a network appliance that only applies one-way communication and does not allow malware analysis system 116 to communicate results back to computer network environment 102. In certain embodiments, boundary controller 108 permits two-way communication. If at step 516 malware analysis system 116 determines not to return the results of the malware analysis of file 124, then the method may end. If at step 516 malware analysis system 116 determines to return the results of the malware analysis of file 124, then the method may proceed to step 518.

At step 518, malware analysis system 116 may return the results (e.g., as results 126) of the analysis of the file 124 to boundary controller 108. Results 126 may include an indication of the malware status of file 124 determined by malware analysis system 116. At step 520, boundary controller 108 may validate results 126. For example, boundary controller 108 may determine whether it is appropriate to communicate results 124 from computer network environment 104 to computer network environment 102 and perform any suitable modifications to results 126. At step 522, boundary controller 108 may determine whether the validation of results 126 at step 520 was successful. If boundary controller 108 determines that the validation of results 126 was not successful, then the method may return to step 500 or another suitable step. If boundary controller 108 determines that the validation of results 126 was successful, then the method may proceed to step 524.

At step 524, boundary controller 108 may make results 126 available to one or more appropriate elements of computer network environment 102. For example, boundary controller 108 may make results 126 available to processing system 112. In certain embodiments, boundary controller 108 may store results 126 in storage module 114. Additionally or alternatively, boundary controller 108 may communicate results 126 to processing system 112, which may then distribute results 126 as appropriate (e.g., to processing system 110). The method may then end.

Figure 6:
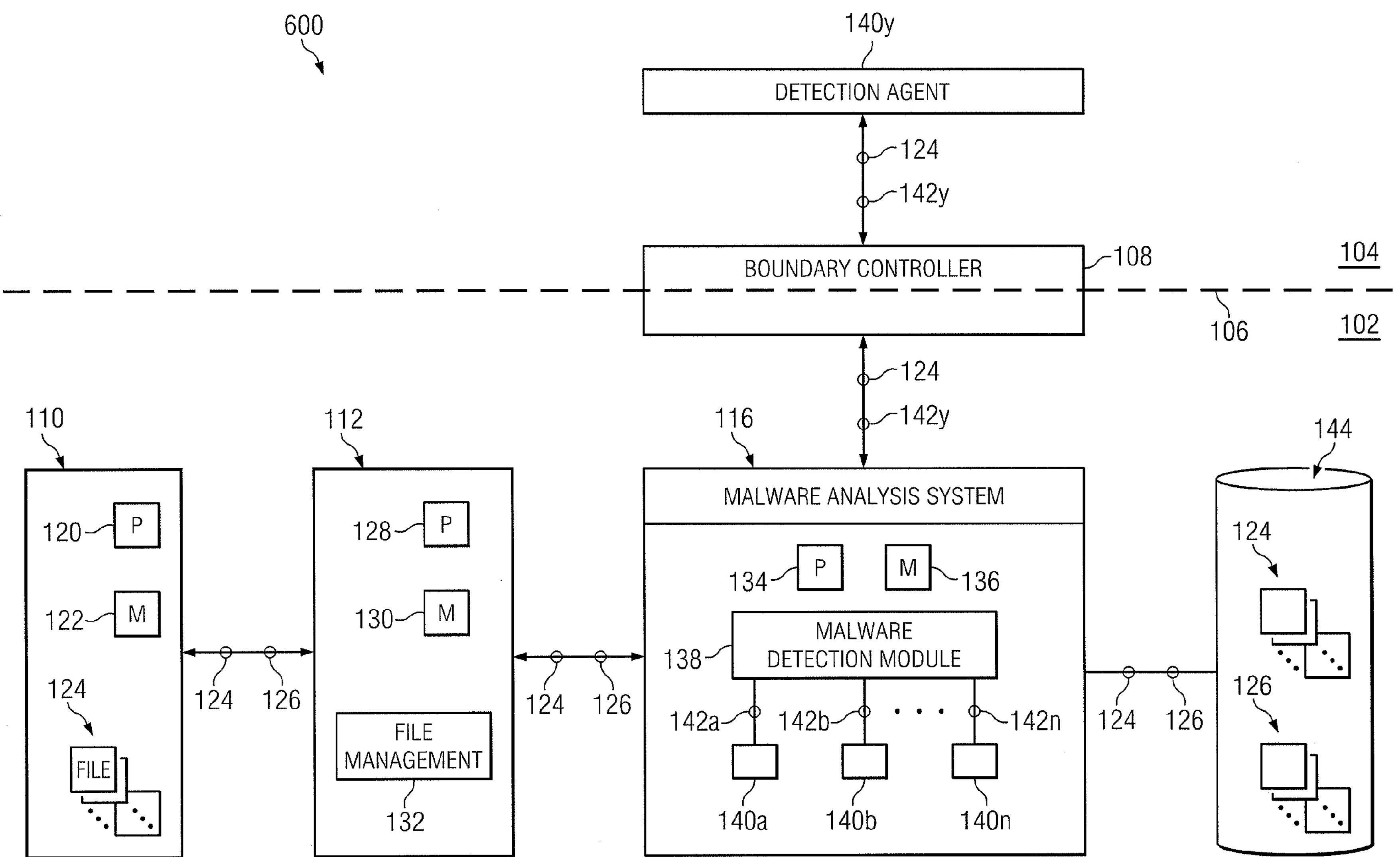
FIG. 6 illustrates another example system for providing a malware analysis using a secure malware detection process, according to certain embodiments of the present disclosure.

FIG. 6 illustrates another example system 600 for providing a malware analysis using a secure malware detection process, according to certain embodiments of the present disclosure. In certain embodiments, certain components of system 600 may be substantially similar to corresponding components of system 100 and will not be described again in detail. Although system 600 is illustrated and primarily described as including particular numbers and types of components arranged in a particular manner, the present disclosure contemplates system 600 including any suitable numbers and types of components arranged in any suitable manner, according to particular needs.

In example system 600, at least a portion of the malware analysis system 116 is positioned in computer network environment 102, which is subject to a relatively less restrictive security classification level than computer network environment 104. For example, in certain embodiments, at least malware detection module 138 is positioned in computer network environment 102. Additionally or alternatively, one or more malware detection agents 140 may be positioned in computer network environment 102.

Malware analysis system 116 may be operable to apply at least one malware detection process that is subject to the relatively more restrictive security classification level of computer network environment 104. The at least one malware detection process is applied to file 124 in computer network environment 104. Additionally or alternatively, malware analysis system 116 is operable to apply one or more malware detection processes that are not subject to the security classification level of computer network environment 104.

In certain embodiments, to apply these malware detection processes, malware analysis system 116 may invoke one or more malware detection agents 140 that are each operable to apply one or more corresponding malware detection processes. For example, one or more malware detection agents 140 may be positioned in computer network environment 102 and may each be operable to apply a corresponding malware detection process that is subject to the security classification level of computer network environment 102 but not the security classification level of computer network environment 104. As another example, one or more malware detection agents 140 (e.g., malware detection agent 140*y*) may be positioned in computer network environment 104 and may each be operable to apply a corresponding malware detection process that is subject to the relatively more restrictive security classification level of computer network environment 104. These malware detection agents 140 may or may not be considered part of malware analysis system 116.

In certain embodiments, to apply one or more malware detection processes that are subject to the more restrictive security classification level of computer network environment 104, malware analysis system 116 may make file 124 available to boundary controller 108. For example, malware detection module 138 may communicate file 124 to boundary controller 108 for boundary controller 108 to make file 124 available to one or more malware detection agents 140 positioned in computer network environment 104 (e.g., malware detection agent 140*y*). Boundary controller 108 may perform appropriate validation of file 124 and if the validation is successful make file 124 available to one or more appropriate malware detection agents 140 positioned in computer network environment 104.

One or more appropriate malware detection agents 140 positioned in computer network environment 104 may be operable to access file 124 and apply to file 124 the one or more malware detection processes that are subject to the more restrictive security classification level of computer network environment 104.

The one or more invoked malware detection agents 140 positioned in computer network environment 104 may return corresponding outputs 140 reflecting the results of the application of their corresponding malware detection processes to file 124. For example, malware detection agent 140*y* may return output 142*y* to boundary controller 108. Boundary controller 108 may perform appropriate validation of output 140*y* and if the validation is successful make output 140*y* available to malware analysis system 116 positioned in computer network environment 102. For example, malware detection module 138 may access output 142*y*.

Malware detection module 138 may access outputs 142 from malware detection agents 140 positioned in computer network environment 102, if appropriate. Malware analysis system 116 (e.g., malware detection module 138) may consider output 142*y* and any other accessed outputs 142 in formulating a malware status of file 124, such as results 126. If appropriate, malware analysis system 116 may make results 126 available to processing system 110 and/or 112.

Figure 7A:
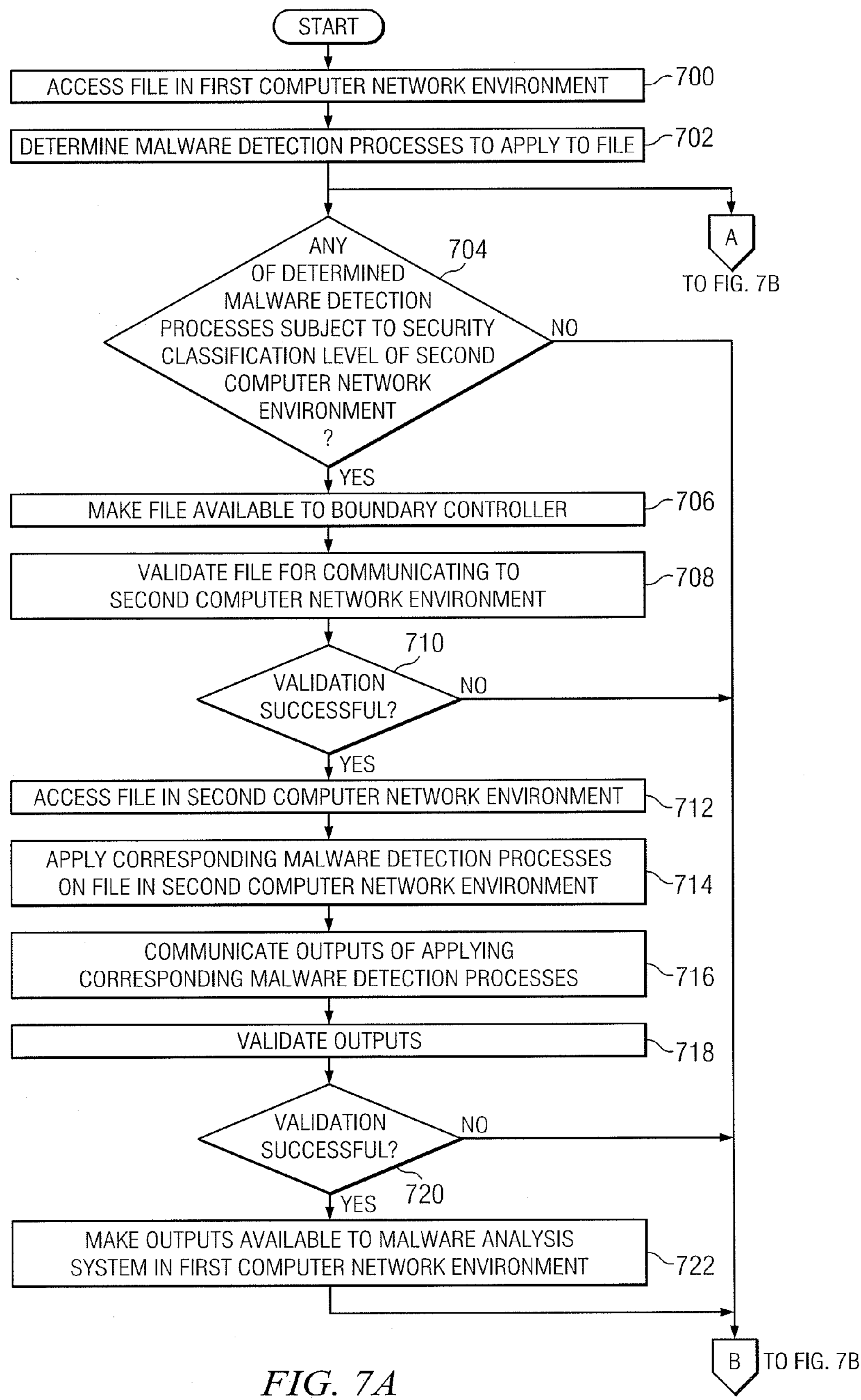
FIG. 7 illustrates another example method for providing a malware analysis using a secure malware detection process, performed using the example system described above with reference to FIG. 6.
Figure 7B:
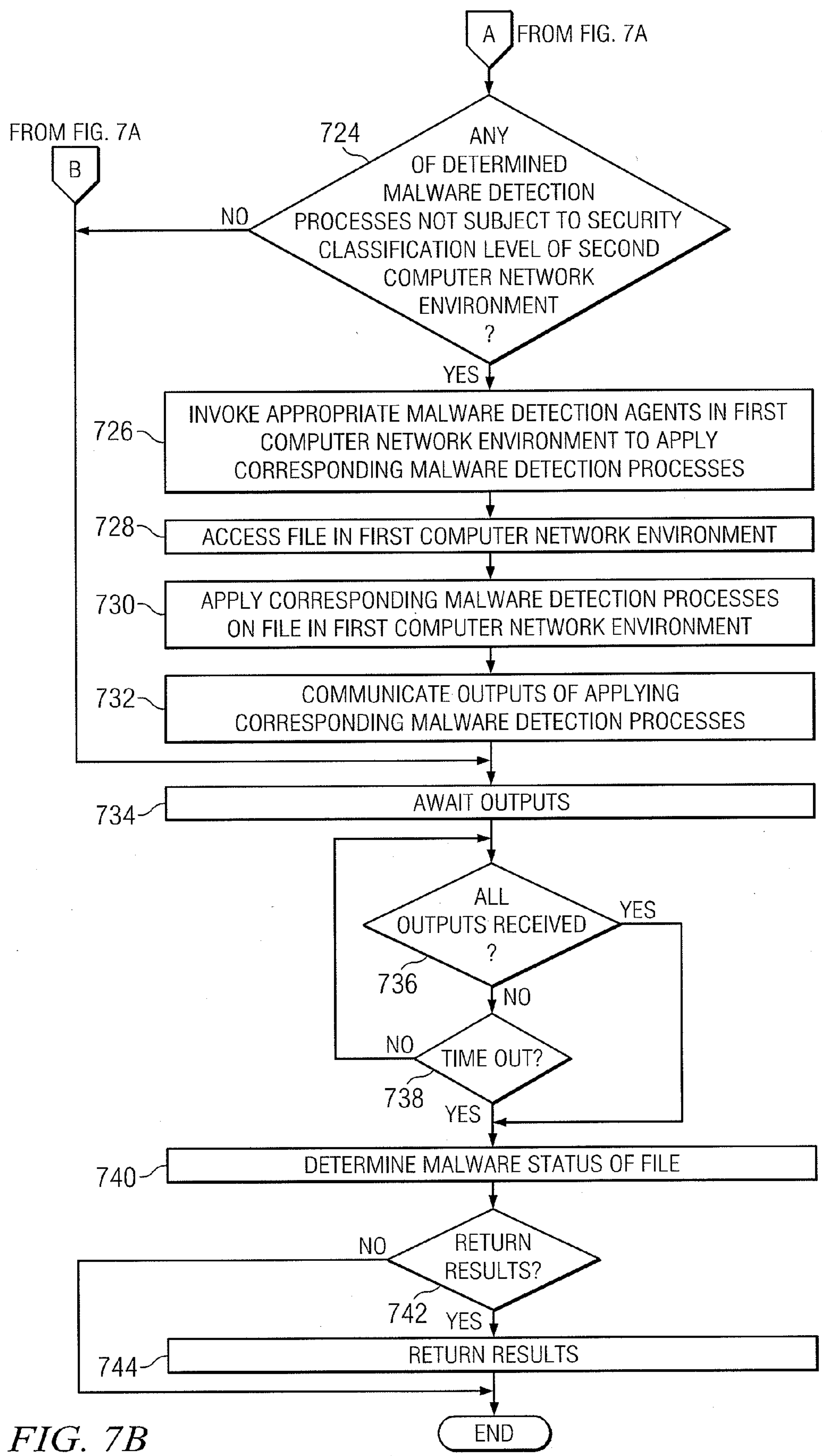

FIG. 7 illustrates another example method for providing a malware analysis using a secure malware detection process, performed using the example system 600 described above with reference to FIG. 6. In this example, a portion of malware analysis system 116 is positioned in computer network environment 102 and at least one malware detection agent 140 is positioned in computer network environment 104. The portion of malware detection system 116 positioned in computer network environment 102 is operable to apply in computer network environment 104 the at least one malware detection process implemented by malware detection agent 140*y*. In this example, the malware detection process is subject to the more security classification level of computer network environment 104, which is more restrictive relative to the security classification level of computer network environment 102. For purposes of this example, references in FIG. 7 to the "first computer network environment" and the "second computer network environment" correspond to computer network environment 102 and computer network environment 104, respectively.

At step 700, malware analysis system 116 may access file 124 in first computer network environment 102. For example, malware detection module 138 may access file 124. The present disclosure contemplates malware analysis system 116 receiving file 124 or otherwise gaining access to file 124 from any suitable source and in any suitable manner, according to particular needs.

As just one example, processing system 112 may receive file 124 from processing system 110. As another example, processing system 112 may receive file 124 from another suitable source, the intended destination of the file 124 being processing system 110. Processing system 112 may determine whether to request a malware analysis of file 124. If processing system 112 determines not to request a malware analysis of file 124, then processing system 112 may await receipt of another file 124. If processing system 112 determines to request a malware analysis of file 124, then processing system 112 may make file 124 available to malware analysis system. For example, processing system 112 may store file 124 in a storage module accessible to malware analysis system 116. Additionally or alternatively, processing system 112 may communicate file 124 (e.g., as part of a malware analysis request) to malware analysis system 116.

In certain embodiments, malware analysis system 116 proactively pulls file 124 from storage (e.g., in an asynchronous transfer mode). Additionally or alternatively, processing system 112 or another suitable component may proactively communicate file 124 to malware analysis system 116.

At step 702, malware analysis system 116 may determine one or more malware detection processes to apply to file 124. For example, malware detection module 138 may determine one or more malware detection processes to apply to file 124. In certain embodiments, malware detection module 138 may determine one or more malware detection agents 140 for applying the one or more malware detection processes. Malware analysis system 116 may determine the one or more malware detection processes to apply to file 124 based on any suitable information, according to particular needs. For example, malware analysis system 116 may determine the one or more malware detection processes based on the type of file 124, the source of file 124, or any other suitable information.

The method may proceed to both steps 704 and 724. In certain embodiments, steps 704-722 and steps 724-732 are performed substantially in parallel.

At step 704, malware analysis system 116 may determine whether one or more of the malware detection processes determined at step 702 are subject to a relatively more restrictive security classification level than the security classification level of the computer network environment in which malware analysis system 116 is primarily located (e.g., computer network environment 102). For example, malware detection module 138 may determine whether one or more of the determined malware detection processes are subject to the security classification level of computer network environment 104. If malware analysis system 116 determines at step 704 that none of the determined malware detection processes are subject to a relatively more restrictive security classification level (e.g., the security classification level of computer network environment 104), then the method may proceed to step 734.

If malware analysis system 116 determines at step 704 that one or more of the determined malware detection processes are subject to a relatively more restrictive security classification level (e.g., the security classification level of computer network environment 104), then at step 706 malware analysis system 116 may make file 124 available to boundary controller 108 for communication to the one or more malware detection agents 140 (e.g., malware detection agent 140*y*) for those one or more malware detection processes subject to the security classification level of computer network environment 104 to be applied. For example, malware analysis system 116 may invoke one or more malware detection agents 140 positioned in computer network environment 104 to apply their corresponding malware detection processes to file 124.

The present disclosure contemplates boundary controller 108 receiving file 124 or otherwise gaining access to file 124 from any suitable source and in any suitable manner, according to particular needs. In certain embodiments, boundary controller 108 proactively pulls file 124 from an appropriate location (e.g., in an asynchronous transfer mode). Additionally or alternatively, malware analysis system 116 may proactively communicate file 124 to boundary controller 108.

At step 708, boundary controller 108 may validate file 124 for communicating (or otherwise making available) file 124 to the determined one or more malware detection agents 140 positioned in computer network environment 104. Validating file 124 may include performing any suitable operations that boundary controller 108 may perform to enforce security boundary 106 and to ensure that file 124 is appropriate for delivery to the determined one or more malware detection agents 140 positioned in computer network environment 104.

At step 710, boundary controller 108 may determine whether the validation of file 124 at step 708 was successful. If boundary controller 108 determines that the validation of file 124 was not successful (and not to communicate (or otherwise make available) file 124 to the determined one or more malware detection agents 140 positioned in computer network environment 104), then the method may move to step 734 or another suitable step. If boundary controller 108 determines that the validation of file 124 was successful (and to communicate (or otherwise make available) file 124 to the determined one or more malware detection agents 140 positioned in computer network environment 104), then the method may proceed to step 712.

At step 712, the one or more malware detection agents 140 (e.g., malware detection agent 140*y*) positioned in computer network environment 104 may access file 124. For example, the determined one or more malware detection agents 140 positioned in computer network environment 104 may proactively pull files 124 from boundary controller 108. Additionally or alternatively, boundary controller 108 may proactively communicate files 124 the determined one or more malware detection agents 140 positioned in computer network environment 104.

At step 714 the one or more malware detection agents 140 (e.g., malware detection agent 140*y*) positioned in computer network environment 104 may apply their corresponding malware detection processes on file 124. At step 716 the one or more malware detection agents 140 positioned in computer network environment 104 may communicate to boundary controller 108 an output 142 of applying their corresponding malware detection processes on file 124. For example, malware detection agent 140*y* may communicate an output 142*y* to boundary controller 108.

At step 718, boundary controller 108 may validate the received outputs 142. For example, boundary controller 108 may determine whether it is appropriate to communicate the received outputs 142 from computer network environment 104 to computer network environment 102 and perform any suitable modifications to the received outputs 142. At step 720, boundary controller 108 may determine whether the validation of outputs 142 at step 718 was successful. If boundary controller 108 determines that the validation of outputs 142 was not successful, then the method may move to step 734 or another suitable step. If boundary controller 108 determines that the validation of outputs 142 was successful, then the method may proceed to step 722.

At step 722, boundary controller 108 may make outputs 142 available to malware analysis system 116. For example, boundary controller 108 may communicate outputs 142 to malware analysis system 116. Additionally or alternatively, boundary controller 108 may store outputs 142 in a storage module accessible to malware analysis system 116.

At step 724, malware analysis system 116 may determine whether one or more of the malware detection processes determined at step 702 are not subject to a relatively more restrictive security classification level than the security classification level of the computer network environment in which malware analysis system is primarily located (e.g., computer network environment 102). For example, malware detection module 138 may determine whether one or more of the determined malware detection processes are not subject to the heightened security classification level of computer network environment 104. If malware analysis system 116 determines at step 724 that none of the determined malware detection processes are subject to the relatively lower restrictive security classification level of computer network environment 102, then the method may proceed to step 734.

If malware analysis system 116 determines at step 724 that one or more of the determined malware detection processes are subject to the security classification level of computer network environment 102 but are not subject to the more restrictive security classification level of computer network environment 104, then malware analysis system 116 may apply the one or more malware detection processes that are not subject to a relatively more restrictive security classification level. For example, at step 726, malware detection module 138 may invoke one or more malware detection modules 140 located in computer network environment 102 that are each operable to analyze file 124 using a corresponding one or more malware detection processes that are not subject to a relatively more restrictive security classification level than the security classification level of the computer network environment in which malware analysis system 116 is primarily located.

At step 728, the one or more malware detection agents 140 positioned in computer network environment 102 may access file 124. At step 730 the one or more malware detection agents 140 positioned in computer network environment 102 may apply their corresponding malware detection processes on file 124. At step 732 the one or more malware detection agents 140 positioned in computer network environment 102 may communicate to malware detection module 138 corresponding outputs 142 of applying their corresponding malware detection processes on file 124.

At step 734, malware analysis system 116 may await outputs of the malware analyses performed by malware detection nodes 140. For example, malware detection module 138 may await output 142*y* from detection agent 140*y* positioned in computer network environment 104. As another example, malware detection module 138 may await outputs from detection agents 140 positioned in computer network environment 102.

At step 736, malware analysis system 116 may determine whether all outputs have been received. If malware analysis system 116 determines at step 736 that not all outputs have been received, then at step 738 malware analysis system 116 may determine whether a time out condition has occurred. For example, after waiting a predetermined time for outputs, if one or more outputs are still outstanding, malware detection module 138 may move forward with the outputs it has received, proceeding to step 740. In certain embodiments, malware detection agents 140 are operable to monitor for a time-out condition and communicate an output to malware detection module 138 if indicating an error if a time-out condition is detected. If at step 738 malware analysis system 116 determines that a time-out condition has not occurred, then the method may return to step 734 for malware analysis system 116 to continue to await outputs of malware detection agents 140.

Returning to step 736, if malware analysis system 116 determines that all results have been received, then at step 740 malware analysis system may determine a malware status of file 124 based at least in part on the output of the applied one or more malware detection processes. For example, malware detection module 138 may analyze outputs (including output 142*y*), if appropriate, to determine a malware status of file 124. In certain embodiments, a human reviewer may provide input into the malware status of file 124. For example, a human reviewer may use analysis console 210 to provide input into determining the malware status of file 124.

At step 742, malware analysis system 116 may determine whether to return results of the malware analysis of file 124. For example, malware detection module 138 may determine whether to return the results based on one or more policies. If at step 742 malware analysis system 116 determines not to return the results of the malware analysis of file 124, then the method may end. If at step 742 malware analysis system 116 determines to return the results of the malware analysis of file 124, then at step 744, malware analysis system 116 may return the results (e.g., as a results 126) of the analysis of the file 124 to processing system 110 and/or processing system 112. Results 126 may include an indication of the malware status of file 124 determined by malware analysis system 116. The method may then end.

Figure 8:
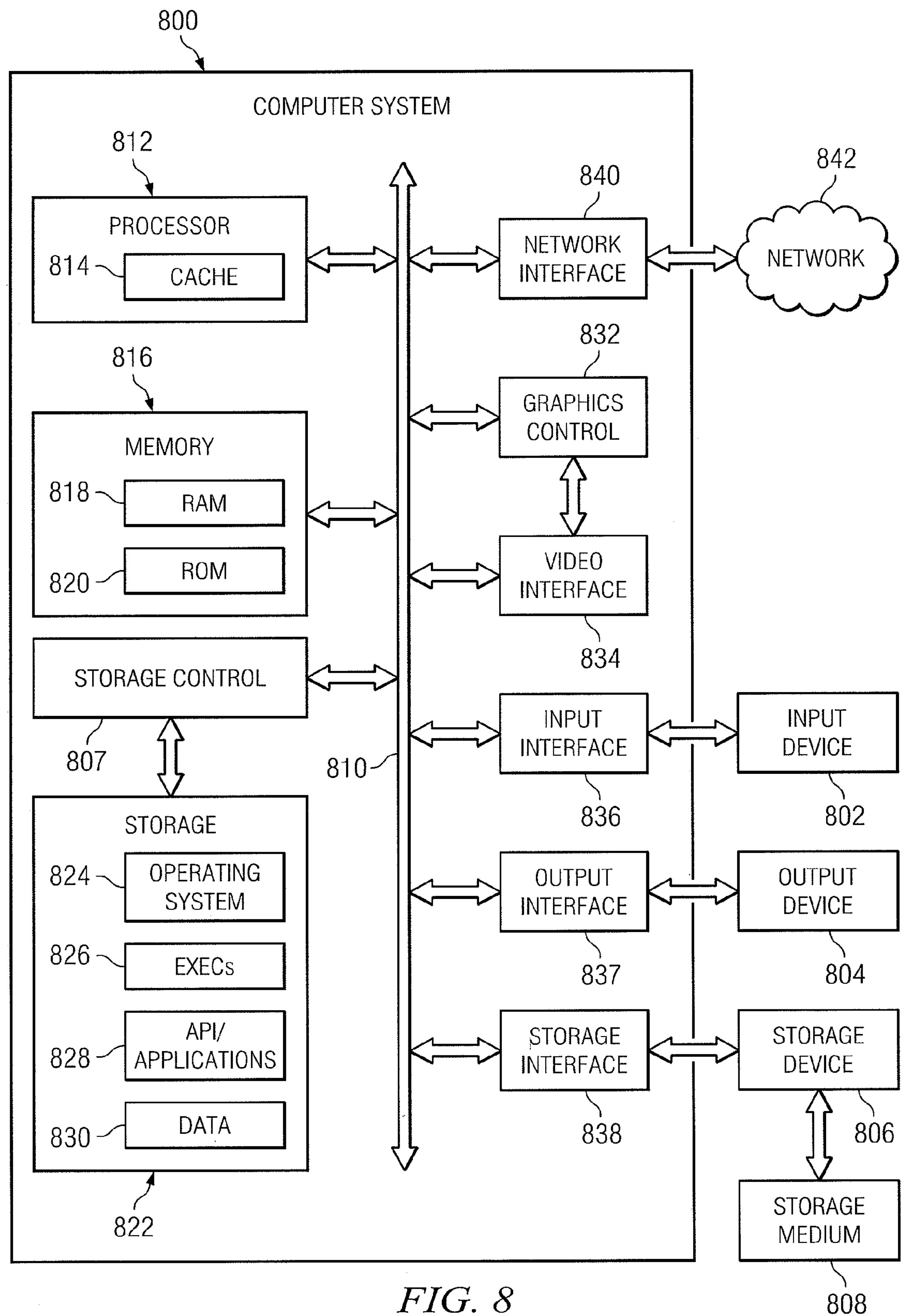
FIG. 8 illustrates an example computer system that may be used for one or more portions of the components describe herein, according to certain embodiments of the present disclosure.

FIG. 8 illustrates an example computer system 800 that may be used for one or more portions of the components describe herein, according to certain embodiments of the present disclosure. Although the present disclosure describes and illustrates a particular computer system 800 having particular components in a particular configuration, the present disclosure contemplates any suitable computer system having any suitable components in any suitable configuration. Moreover, computer system 800 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. Portions or all of system 100 may be implemented using all of the components, or any appropriate combination of the components, of computer system 800 described below.

Computer system 800 may have one or more input devices 802 (which may include a keypad, keyboard, mouse, stylus, or other input devices), one or more output devices 804 (which may include one or more displays, one or more speakers, one or more printers, or other output devices), one or more storage devices 806, and one or more storage media 808. An input device 802 may be external or internal to computer system 800. An output device 804 may be external or internal to computer system 800. A storage device 806 may be external or internal to computer system 800. A storage medium 808 may be external or internal to computer system 800.

System bus 810 couples subsystems of computer system 800 to each other. Herein, reference to a bus encompasses one or more digital signal lines serving a common function. The present disclosure contemplates any suitable system bus 810 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-E), and Accelerated Graphics Port (AGP) bus.

Computer system 800 includes one or more processors 812 (or central processing units (CPUs)). A processor 812 may contain a cache 814 for temporary local storage of instructions, data, or computer addresses. Processors 812 are coupled to one or more storage devices, including memory 816. Memory 816 may include RAM 818 and ROM 820. Data and instructions may transfer bi-directionally between processors 812 and RAM 818. Data and instructions may transfer uni-directionally to processors 812 from ROM 820. RAM 818 and ROM 820 may include any suitable computer-readable storage media.

Computer system 800 includes fixed storage 822 coupled bi-directionally to processors 812. Fixed storage 822 may be coupled to processors 812 via storage control unit 807. Fixed storage 822 may provide additional data storage capacity and may include any suitable computer-readable storage media. Fixed storage 822 may store an operating system (OS) 824, one or more executables (EXECs) 826, one or more applications or programs 828, data 830 and the like. Fixed storage 822 is typically a secondary storage medium (such as a hard disk) that is slower than primary storage. In appropriate cases, the information stored by fixed storage 822 may be incorporated as virtual memory into memory 816. In certain embodiments, fixed storage 822 may include network resources, such as one or more storage area networks (SAN) or network-attached storage (NAS).

Processors 812 may be coupled to a variety of interfaces, such as, for example, graphics control 832, video interface 834, input interface 836, output interface 837, and storage interface 838, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 840 may couple processors 812 to another computer system or to network 842. Network interface 840 may include wired, wireless, or any combination of wired and wireless components. Such components may include wired network cards, wireless network cards, radios, antennas, cables, or any other appropriate components. With network interface 840, processors 812 may receive or send information from or to network 842 in the course of performing steps of certain embodiments. Certain embodiments may execute solely on processors 812. Certain embodiments may execute on processors 812 and on one or more remote processors operating together.

In a network environment, where computer system 800 is connected to network 842, computer system 800 may communicate with other devices connected to network 842. Computer system 800 may communicate with network 842 via network interface 840. For example, computer system 800 may receive information (such as a request or a response from another device) from network 842 in the form of one or more incoming packets at network interface 840 and memory 816 may store the incoming packets for subsequent processing. Computer system 800 may send information (such as a request or a response to another device) to network 842 in the form of one or more outgoing packets from network interface 840, which memory 816 may store prior to being sent. Processors 812 may access an incoming or outgoing packet in memory 816 to process it, according to particular needs.

Certain embodiments involve one or more computer-storage products that include one or more tangible, computer-readable storage media that embody software for performing one or more steps of one or more processes described or illustrated herein. In certain embodiments, one or more portions of the media, the software, or both may be designed and manufactured specifically to perform one or more steps of one or more processes described or illustrated herein. Additionally or alternatively, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In certain embodiments, software may be machine code which a compiler may generate or one or more files containing higher-level code which a computer may execute using an interpreter.

As an example and not by way of limitation, memory 816 may include one or more tangible, computer-readable storage media embodying software and computer system 800 may provide particular functionality described or illustrated herein as a result of processors 812 executing the software. Memory 816 may store and processors 812 may execute the software. Memory 816 may read the software from the computer-readable storage media in mass storage device 816 embodying the software or from one or more other sources via network interface 840. When executing the software, processors 812 may perform one or more steps of one or more processes described or illustrated herein, which may include defining one or more data structures for storage in memory 816 and modifying one or more of the data structures as directed by one or more portions the software, according to particular needs.

In certain embodiments, the described processing and memory elements (such as processors 812 and memory 816) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 800 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A computer-implemented system, comprising:

a boundary controller computer processor operable to:

implement a security boundary between a first computer network environment and a second computer network environment, the second computer network environment having a security classification level that is more restrictive than a security classification level of the first computer network environment; and receive via the first computer network environment a file, the file comprising the security classification level of the first computer network environment; and a malware analysis computer processor positioned in the second computer network environment and operable to:

receive via the boundary controller the file comprising the security classification level of the first computer network environment; and apply a first malware detection process on the file comprising the security classification level of the first computer network environment, the first malware detection process subject to the security classification level of the second computer network environment;

wherein the malware analysis computer processor is further operable, in response to performing the malware analysis of the file by applying the detection process on the file, to communicate only a malware analysis result, and not any information relating to the first malware detection process, from the second computer network environment to the first computer network environment via the boundary controller.

2. The system of claim 1, wherein the malware analysis computer processor is operable to:

apply the first malware detection process on the file by performing operations comprising invoking a first malware detection agent operable to analyze the file using the first malware detection process; and access an output of the first malware detection agent.

3. The system of claim 2, wherein the malware analysis computer processor is operable to:

apply a second malware detection process on the file by performing operations comprising invoking a second malware detection agent operable to analyze the file using the second malware detection process, the second malware detection process not subject to the security classification level of the second computer network environment; and access an output of the second malware detection agent.

4. The system of claim 1, wherein the boundary controller computer processor permits certain communications from the first computer network environment to the second computer network environment and prohibits communications from the second computer network environment to the first computer network environment.

5. The system of claim 1, wherein:

a processing system positioned in the first computer network environment is operable to store the file in a storage module positioned in the first computer network environment; and the boundary controller computer processor is operable to receive the file by proactively pulling the file from the storage module.

6. The system of claim 1, wherein the boundary controller computer processor receives the file from a processing system positioned in the first computer network environment, the processing system operable to:

determine that the file should be analyzed for malware; and make the file available to the boundary controller for a malware analysis to be performed on the file.

7. The system of claim 1, wherein the file comprises an email communication including an attachment.

8. A computer-implemented system, comprising:

a boundary controller computer processor operable to:

implement a security boundary between a first computer network environment and a second computer network environment, the second computer network environment having a security classification level that is more restrictive than a security classification level of the first computer network environment;

receive from the first computer network environment a file, the file comprising the security classification level of the first computer network environment; and a first malware detection computer processor positioned in the second computer network environment and operable to:

receive via the boundary controller the file comprising the security classification level of the first computer network environment; and apply a first malware detection process on the file comprising the security classification level of the first computer network environment, the first malware detection process subject to the security classification level of the second computer network environment;

wherein the malware analysis computer processor is further operable, in response to performing the malware analysis of the file by applying the detection process on the file, to communicate a malware analysis result from the second computer network environment to the first computer network environment via the boundary controller.

9. The system of claim 8, wherein:

the first malware detection computer processor agent is part of a malware analysis system, the malware analysis system being positioned in the second computer network environment; and the malware analysis computer processor is operable to invoke a second malware detection agent positioned in the second computer network environment to perform a malware analysis of the file even though the security classification level of the first computer network environment is sufficient for the second malware detection agent.

10. The system of claim 8, wherein:

the first malware detection computer processor is part of a malware analysis system that is operable to invoke a plurality of malware detection agents for analyzing the file, each malware detection agent operable to perform a corresponding malware analysis process on the file, the first malware detection agent being one of the plurality malware detection agents; and the malware analysis system is positioned in the second computer network environment.

11. The system of claim 8, wherein the connection across the boundary controller computer processor is a one-way connection such that the boundary controller computer processor permits communication only in the direction from the first side of the boundary controller to the second side of the boundary controller.

12. The system of claim 8, wherein:

a processing system positioned in the first computer network environment is operable to store the file in a storage module positioned in the first computer network environment; and the boundary controller computer processor is operable to proactively pull the file from the storage module.

13. The system of claim 8, wherein:

the first malware detection computer processor is part of a malware analysis system at least a portion of which is positioned in the first computer network environment; and the malware analysis system is operable to communicate the file for the malware analysis to be performed on the file.

14. The system of claim 13, wherein:

the malware analysis system is operable to invoke a second malware detection computer processor positioned in the first computer network environment to perform a malware analysis of the file using a second malware detection process; and the second malware detection process is subject to the security classification level of the first computer network environment and not the security classification level of the second computer network environment.

15. The system of claim 8, wherein:

the first malware detection computer processor is part of a malware analysis system that is operable to invoke a plurality of malware detection computer processors for analyzing the file, each malware detection computer processor operable to perform a corresponding malware analysis process on the file, the first malware detection computer processor being one of the plurality of malware detection computer processors; and at least one of the multiple malware detection agents is positioned in the first computer network environment.

16. The system of claim 8, wherein the boundary controller computer processor is operable to receive the file from a processing system positioned in the first computer network environment, the processing system operable to:

determine that the file should be analyzed for malware; and make the file available to the boundary controller for a malware analysis to be performed on the file.

17. The system of claim 16, wherein the boundary controller computer processor receiving the file from the processing system comprises the boundary controller computer processor receiving the file from a malware analysis system, the malware analysis system having received the file from the processing system.

18. The system of claim 8, wherein the malware analysis system is further operable, in response to performing the malware analysis of the file by applying the detection process on the file, communicate a malware analysis result from the second computer network environment to the first computer network environment via the boundary controller computer processor.

19. The system of claim 8, wherein the file comprises an email communication including an attachment.

20. A computer-implemented system, comprising:

a boundary controller computer processor operable to:

implement a security boundary between a first computer network environment and a second computer network environment, the second computer network environment having security classification level that is more restrictive than a security classification level of the first computer network environment;

receive from a malware analysis system, at least a portion of which is positioned in the first computer network environment, a file comprising the security classification level of the first computer network environment;

a first malware detection computer processor positioned in the second computer network environment and operable to:

receive via the boundary controller the file comprising the security classification level of the first computer network environment; and apply a first malware detection process on the file comprising the security classification level of the first computer network environment, the first malware detection process subject to the security classification level of the second computer network environment;

wherein the malware analysis computer processor is further operable, in response to performing the malware analysis of the file by applying the detection process on the file, to communicate a malware analysis result from the second computer network environment to the first computer network environment via the boundary controller.

21. The system of claim 20, wherein the first malware detection computer processor is operable to communicate a result of applying the first malware detection process on the file to the boundary controller, the boundary controller operable to communicate the result to the portion of the malware analysis system positioned in the first computer network environment.

22. The system of claim 20, wherein:

the malware analysis system is operable to invoke a second malware detection computer processor positioned in the first computer network environment, the second malware detection computer processor operable to apply a second malware detection process on the file; and the second malware detection process is subject to the security classification level of the first computer network environment and not the security classification level of the second computer network environment.

23. The system of claim 20, wherein:

the malware analysis system is operable to invoke a plurality of malware detection computer processors for analyzing the file, each malware detection computer processor operable to perform a corresponding malware analysis process on the file, the first malware detection computer processor being one of the plurality of malware detection computer processors; and at least one of the multiple malware detection agents is positioned in the first computer network environment.

24. The system of claim 20, wherein the portion of the malware analysis system positioned in the first computer network environment is operable to:

receive the file from a processing system positioned in the first computer network environment, the processing system operable to:

determine that the file should be analyzed for malware; and communicate the file for a malware analysis to be performed on the file; and invoke the first malware detection computer processor by communicating the file to the boundary controller computer processor.

25. The system of claim 21, wherein:

the portion of the malware analysis system positioned in the first computer network environment is operable to store the file in a storage module positioned in the first computer network environment; and the boundary controller computer processor is operable to proactively pull the file from the storage module.

26. The system of claim 1, wherein the malware analysis system is further operable, in response to performing the malware analysis of the file by applying the detection process on the file, communicate a malware analysis result from the second computer network environment to the first computer network environment via the boundary controller computer processor.

27. The system of claim 21, wherein the file comprises an email communication including an attachment.

* * * * *

UNITED STATES PATENT AND TRADEMARK OFFICE

CERTIFICATE OF CORRECTION

PATENT NO. : 8,776,242 B2
APPLICATION NO. : 13/306344
DATED : July 8, 2014
INVENTOR(S) : Monty D. McDougal It is certified that error appears in the above-identified patent and that said Letters Patent is hereby corrected as shown below:

In the Specification

In column 4, line 33, delete “3 G, 4 G” and insert --3G, 4G--, therefor

In column 6, line 1, delete “102” and insert --110--, therefor

In column 6, line 48, delete “maiware” and insert --malware--, therefor

In column 6, line 49, delete “maiware” and insert --malware--, therefor

In column 6, line 49, delete “maiware” and insert --malware--, therefor

In column 7, line 4, delete “maiware” and insert --malware--, therefor

In column 8, line 27, delete “fl” and insert --firmware,--, therefor

In column 8, line 40, delete “foams” and insert --forms--, therefor

In column 11, line 48, delete “3 G” and insert --3G--, therefor

In column 12, line 11, before “system”, insert --malware analysis--, therefor

In column 12, line 65, delete “SHA 1” and insert --SHA1--, therefor

In column 13, line 35, delete “108” and insert --116--, therefor

In column 13, line 47, delete “210” and insert --202--, therefor

In column 17, line 23, delete “node” and insert --malware analysis system--, therefor Signed and Sealed this
Twenty-second Day of September, 2015

Michelle K. Lee
*Director of the United States Patent and Trademark Office*

In column 18, line 20, before "410", insert --databases--, therefor

In column 20, line 8, delete "114" and insert --116--, therefor

In column 20, line 49, before "124", insert --on file--, therefor

In column 21, line 39, delete "124" and insert --126--, therefor

In column 22, line 62, delete "140" and insert --142--, therefor

In column 22, line 67, delete "140y" and insert --142y--, therefor

In column 22, line 67, delete "140y" and insert --142y--, therefor

In column 25, line 66, delete "modules" and insert --agent--, therefor

In column 26, line 19, delete "nodes" and insert --agent--, therefor

In column 26, line 20, before "detection", insert --malware--, therefor

In column 27, line 24, delete "media" and insert --medium--, therefor